US012687798B2

(12) United States Patent
Watanabe et al.

(10) Patent No.: US 12,687,798 B2
(45) Date of Patent: Jul. 21, 2026

(54) ELECTROPHOTOGRAPHIC MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Hiroaki Watanabe, Kanagawa (JP); Katsuya Kodama, Kanagawa (JP); Masatsugu Hongo, Shizuoka (JP); Yuichi Kikuchi, Shizuoka (JP); Atsushi Uematsu, Shizuoka (JP); Satoru Nishioka, Shizuoka (JP); Yasuhiro Fushimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/095,475

(22) Filed: Mar. 31, 2025

(65) Prior Publication Data

US 2025/0314987 A1 Oct. 9, 2025

(30) Foreign Application Priority Data

Apr. 4, 2024 (JP) ................................ 2024-060863

(51) Int. Cl.

*G03G 15/02* (2006.01)
*G03G 15/08* (2006.01)
*G03G 21/18* (2006.01)

(52) U.S. Cl.

CPC ..... *G03G 15/0233* (2013.01); *G03G 15/0806* (2013.01); *G03G 15/0808* (2013.01);

(Continued)

(58) Field of Classification Search

CPC ........... G03G 15/0233; G03G 15/0806; G03G 15/0808; G03G 15/0812; G03G 15/0818; G03G 15/0896; G03G 21/1814

See application file for complete search history.

(56) References Cited

U.S. PATENT DOCUMENTS 8,440,307 B2 5/2013 Nose et al.
8,481,167 B2 7/2013 Watanabe et al.

(Continued)

FOREIGN PATENT DOCUMENTS

JP 2020-166210 A 10/2020
JP 2021-67924 A 4/2021

(Continued)

OTHER PUBLICATIONS

Sanada, T., et al., Morphology Control of Polymer Alloy by Reactive Processing and Morphology Evolution, Sumitomo Chemical Co., Ltd. Petrochemicals Research Laboratory, pp. 42-54.

(Continued)

*Primary Examiner* — Joseph S Wong
(74) *Attorney, Agent, or Firm* — VENABLE LLP

(57) ABSTRACT

An electrophotographic member including a support member having a conductive outer surface; and a conductive layer disposed on an outer surface of the support member; wherein the conductive layer includes a matrix including a first rubber, and at least one domain dispersed in the matrix, volume resistivity of the matrix is $1.00\times10^{8}$ to $1.00\times10^{12}$ Ω·cm, the at least one domain includes a domain A including a second rubber and an electronic conductive agent; the conductive layer further includes an insulating region including a third rubber; in a case where impedance of the electrophotographic member is measured under specific conditions, impedance X at a specific frequency is $1.00\times10^{6}$ to $1.00\times10^{8}$Ω; and a relationship between impedance Y (Continued)

under specific frequency and the impedance X satisfies X/Y≥7.5.

13 Claims, 7 Drawing Sheets

(52) U.S. Cl.
CPC ..... *G03G 15/0812* (2013.01); *G03G 15/0818* (2013.01); *G03G 15/0896* (2013.01); *G03G 21/1814* (2013.01)

(56) References Cited

U.S. PATENT DOCUMENTS

| | | | |
|---|---|---|---|
| 8,491,994 B2 | 7/2013 | Harada et al. | |
| 8,501,312 B2 | 8/2013 | Watanabe et al. | |
| 8,538,298 B2 | 9/2013 | Harada et al. | |
| 8,622,881 B1 | 1/2014 | Harada et al. | |
| 8,628,854 B2 | 1/2014 | Yamauchi et al. | |
| 8,668,987 B2 | 3/2014 | Yamauchi et al. | |
| 8,685,601 B2 | 4/2014 | Nose et al. | |
| 8,715,830 B2 | 5/2014 | Yamada et al. | |
| 8,750,762 B2 | 6/2014 | Harada et al. | |
| 8,771,818 B2 | 7/2014 | Nishioka et al. | |
| 8,852,743 B2 | 10/2014 | Kikuchi et al. | |
| 8,923,732 B2 | 12/2014 | Harada et al. | |
| 8,991,053 B2 | 3/2015 | Watanabe et al. | |
| 9,075,333 B2 | 7/2015 | Uematsu et al. | |
| 9,128,403 B2 | 9/2015 | Yamauchi et al. | |
| 9,146,482 B2 | 9/2015 | Watanabe et al. | |
| 9,274,442 B2 | 3/2016 | Sato et al. | |
| 9,360,789 B1 | 6/2016 | Masu et al. | |
| 9,360,833 B2 | 6/2016 | Terada et al. | |
| 9,372,429 B2 | 6/2016 | Watanabe et al. | |
| 9,411,307 B2 | 8/2016 | Matsuda et al. | |
| 9,442,408 B2 | 9/2016 | Yamauchi et al. | |
| 9,442,451 B2 | 9/2016 | Yamauchi et al. | |
| 9,448,502 B2 | 9/2016 | Taniguchi et al. | |
| 9,581,931 B2 | 2/2017 | Yamada et al. | |
| 9,599,913 B2 | 3/2017 | Nishioka et al. | |
| 9,599,914 B2 | 3/2017 | Uematsu et al. | |
| 9,639,009 B2 | 5/2017 | Yamaguchi et al. | |
| 9,651,888 B2 | 5/2017 | Muranaka et al. | |
| 9,665,028 B2 | 5/2017 | Arimura et al. | |
| 9,740,133 B2 | 8/2017 | Yamauchi et al. | |
| 9,811,009 B2 | 11/2017 | Yamada et al. | |
| 9,897,931 B2 | 2/2018 | Nishioka et al. | |
| 9,904,199 B2 | 2/2018 | Terada et al. | |
| 9,910,379 B2 | 3/2018 | Furukawa et al. | |
| 9,958,802 B2 | 5/2018 | Kikuchi et al. | |
| 9,964,914 B2 | 5/2018 | Arimura et al. | |
| 9,977,353 B2 | 5/2018 | Nishioka et al. | |
| 10,018,927 B2 | 7/2018 | Yamada et al. | |
| 10,018,934 B2 | 7/2018 | Yamada et al. | |
| 10,025,216 B2 | 7/2018 | Uematsu et al. | |
| 10,108,129 B2 | 10/2018 | Yamaguchi et al. | |
| 10,146,149 B2 | 12/2018 | Watanabe et al. | |
| 10,248,042 B2 | 4/2019 | Uematsu et al. | |
| 10,280,148 B2 | 5/2019 | Nishioka et al. | |
| 10,317,811 B2 | 6/2019 | Tomomizu et al. | |
| 10,416,588 B2 | 9/2019 | Masu et al. | |
| 10,558,136 B2 | 2/2020 | Furukawa et al. | |
| 10,649,350 B2 | 5/2020 | Yamaguchi et al. | |
| 10,678,154 B2 | 6/2020 | Takashima et al. | |
| 10,678,158 B2 | 6/2020 | Kikuchi et al. | |
| 10,845,724 B2 | 11/2020 | Kikuchi et al. | |
| 11,112,719 B2 | 9/2021 | Makisumi et al. | |
| 11,112,748 B2 | 9/2021 | Yamada et al. | |
| 11,137,716 B2 | 10/2021 | Hiyama et al. | |
| 11,169,454 B2 | 11/2021 | Nishioka et al. | |
| 11,175,602 B2 | 11/2021 | Nishioka et al. | |
| 11,307,509 B2 | 4/2022 | Hino et al. | |
| 11,340,553 B2 | 5/2022 | Watariguchi et al. | |
| 11,347,156 B2 | 5/2022 | Kurachi et al. | |
| 11,366,402 B2 | 6/2022 | Ishiduka et al. | |
| 11,385,559 B2 | 7/2022 | Kikuchi et al. | |
| 11,392,050 B2 | 7/2022 | Nishida et al. | |
| 11,397,388 B2 | 7/2022 | Nishioka et al. | |
| 11,556,073 B2 | 1/2023 | Fushimoto et al. | |
| 11,586,121 B2 | 2/2023 | Yamada et al. | |
| 11,619,890 B2 | 4/2023 | Uematsu et al. | |
| 11,640,122 B2 | 5/2023 | Kikuchi et al. | |
| 11,644,761 B2 | 5/2023 | Kodama et al. | |
| 11,675,282 B2 | 6/2023 | Yamaguchi et al. | |
| 11,835,878 B2 | 12/2023 | Kodama et al. | |
| 11,971,683 B2 | 4/2024 | Nishioka et al. | |
| 12,032,331 B2 | 7/2024 | Uematsu et al. | |
| 12,259,674 B2 | 3/2025 | Takashima et al. | |
| 12,306,576 B2 | 5/2025 | Segawa et al. | |
| 2008/0042108 A1* | 2/2008 | Tajima | C08L 21/00 252/500 |
| 2014/0219682 A1* | 8/2014 | Tsuto | G03G 15/0233 399/176 |
| 2020/0310266 A1 | 10/2020 | Kikuchi et al. | |
| 2021/0033996 A1 | 2/2021 | Kikuchi et al. | |
| 2022/0229379 A1 | 7/2022 | Kaneko et al. | |
| 2022/0244673 A1* | 8/2022 | Takashima | G03G 15/0818 |
| 2023/0280667 A1 | 9/2023 | Uematsu et al. | |
| 2023/0288826 A1 | 9/2023 | Nakazono et al. | |
| 2023/0288867 A1 | 9/2023 | Shimozawa et al. | |
| 2025/0102945 A1 | 3/2025 | Nishioka et al. | |
| 2025/0102946 A1 | 3/2025 | Uematsu et al. | |

FOREIGN PATENT DOCUMENTS

| | | |
|---|---|---|
| JP | 2022-76450 A | 5/2022 |
| WO | 2022/097743 A1 | 5/2022 |

OTHER PUBLICATIONS

U.S. Appl. No. 19/095,468, Katsuya Kodama, filed Mar. 31, 2025.
U.S. Appl. No. 19/095,499, Masatsugu Hongo, filed Mar. 31, 2025.

* cited by examiner

ELECTROPHOTOGRAPHIC MEMBER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic member, a process cartridge and an electrophotographic image forming apparatus that can be used for electrophotography.

Description of the Related Art

In an electrophotographic image forming apparatus, conductive members are used as electrophotographic members such as a charging member, a transfer member, and a developing member. The conductive members play a role of transporting the charges from a conductive support member to a surface of the conductive member, and provides charges to a contacted object by discharging or triboelectric charging. As the conductive member, an electrophotographic member, constituted of a conductive support member and a conductive layer disposed on the support member, for example, is known.

A charging member is a member that generates an electric discharge between itself and the photosensitive drum to charge the surface of the photosensitive drum and needs to achieve uniform charge on the photosensitive drum.

Due to the recent increase in the speed and service life of electrophotographic apparatuses, not only countermeasures to deal with the image deterioration caused by uneven electric discharge due to an increase in the amount of dirt substances adhering to the charging member but also countermeasures to suppress the image defects caused by the injection charging to the photosensitive drum as a result of high-speed rotation.

Japanese Patent Application Publication No. 2022-076450 discloses a charging member that removes the electric charge of dirt substances on the surface of the charging member as means to prevent image deterioration even if the dirt substances adhere to the surface of the charged member for a longer service life. Specifically, the conductive layer has a matrix containing a crosslinked product of a first rubber and a plurality of domains in which conductive particles are dispersed in the matrix, and further, second conductive particles are present as primary particles in the matrix.

SUMMARY OF THE INVENTION

According to the studies made by the present inventors, when the charging member described in Japanese Patent Application Publication No. 2022-076450 was evaluated in a recent high-speed and long-life process, a white spot image caused by abnormal discharging due to the dirt attached to the charging member being charged could be improved. On the other hand, when the charging member rotates at a high speed relative to the photosensitive drum, there were cases where a minute slip occurred at the contact region, and the injection charging from the charging member on the photosensitive drum might cause white blur images. Therefore, it was recognized that there was room for improvement.

The study on the cause of the occurrence of white blur images caused by injection charging revealed that the cause is the improved charge transportability of the conductive layer to eliminate the electric charge on the dirt adhering to the charging member. In other words, it was recognized that there is a trade-off relationship between countermeasures against dirt for longer life and countermeasures against injection charging for higher speed operation.

The present disclosure is directed to an electrophotographic member capable of simultaneously suppressing both white spot images caused by dirt substances and white blur images caused by injection charging, even when used in a high-speed process over a long period of time.

The present disclosure is also directed to a process cartridge that contributes to high-quality electrophotographic image formation. Furthermore, the present disclosure is directed to an electrophotographic image forming apparatus capable of forming a high-quality electrophotographic image.

The present disclosure relates to an electrophotographic member comprising:

a support member having a conductive outer surface; and a conductive layer disposed on an outer surface of the support member, wherein the conductive layer comprises a matrix comprising a first rubber, and at least one domain dispersed in the matrix;

volume resistivity of the matrix is $1.00\times10^{8}$ to $1.00\times10^{12}$ Ω·cm;

the at least one domain comprises a domain A comprising a second rubber and an electronic conductive agent;

the conductive layer further comprises an insulating region comprising a third rubber;

a volume resistivity of the insulating region is greater than $1.00\times10^{12}$ Ω·cm;

in a case where a platinum electrode is directly disposed on an outer surface of the electrophotographic member and impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode, impedance X at a frequency of $1.0\times10^{-1}$ Hz is $1.00\times10^{6}$ to $1.00\times10^{8}$Ω; and in a case where impedance is measured while a DC voltage of 10 V and an AC voltage of 1 V in amplitude are applied in a superimposed manner between the outer surface of the support member and the platinum electrode, a relationship between impedance Y at a frequency of $1.0\times10^{-1}$ Hz and the impedance X satisfies an expression (1) below:

$$X/Y \geq 7.5. \tag{1}$$

At least one aspect of the present disclosure provides an electrophotographic member capable of simultaneously suppressing both a white spot image caused by dirt substances and a white blur image caused by injection charging, even when used in a high-speed process over a long period of time. Also, at least one aspect of the present disclosure provides a process cartridge and an electrophotographic image forming apparatus that contribute to high-quality electrophotographic image formation.

Further features of the present invention will become apparent from the following description of exemplary embodiments with reference to the attached drawings.

DESCRIPTION OF THE EMBODIMENTS

Figure 1:
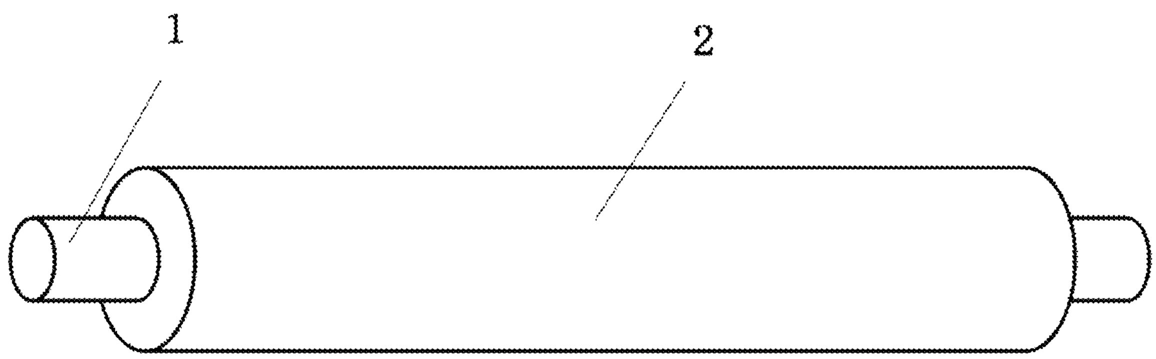
FIG. 1 is a schematic view of a charging roller.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

Embodiments of the present disclosure will be described in detail with reference to the drawings. Composing elements described in the embodiments, however, are merely examples, and are not intended to limit the scope of the present disclosure thereto.

The present disclosure relates to a conductive member capable of simultaneously suppressing both white spot images, which are image deterioration caused by the electric charge of the dirt substance adhering to the surface of an electrophotographic member and white blur images caused by injection charging into a photosensitive drum due to high-speed operation, even when used in a high-speed process over a long period of time. Hereinafter, a charging member will be described as an example of an electrophotographic member.

The present inventors have estimated the following mechanisms of suppressing white-spot images caused by the phenomenon that the dirt adhering to the charging member is electrically charged in the charging member and the reason why image deterioration caused by injection charging has occurred in the charging member according to Japanese Patent Application Publication No. 2022-076450.

The dirt substances in this disclosure are toner and external additives which are not transferred to paper or to an intermediate transfer member in the transfer processing of the electrophotographic image forming process, and which remain on the surface of the photosensitive drum, and reach and adhere to the charging member.

The toner and external additives often have insulation properties to hold predetermined charges that are electrostatically transferred from the developing roller to the photosensitive drum in the developing process. The toner and external additives remaining on the surface of the photosensitive drum, without being transferred from the photosensitive drum to the paper and intermediate transfer member, are influenced by discharge at the transfer roller and rubbing with paper before reaching the charging member again, and are charged in a predetermined distribution of positive and negative charges.

The charging member (hereafter also called "charging roller") is a member that generates a potential difference between the charging member and the surface of the photosensitive drum when DC voltage is applied, in order to discharge electricity to the photosensitive drum. Therefore it is difficult to prevent the adhering of components, of which polarity (negative/positive) is opposite of the polarity of the charging bias which generates the above potential difference, to the charging roller side due to the electrostatic attraction. In other words, for the charging member which should be used over a long period of time, it is demanded to suppress abnormal discharge caused by the dirt substances, even if the dirt substances adhere to the charging roller, as described below.

Next, white spot images, which are generated by abnormal discharge due to dirt substances, will be described. The discharge phenomena are generated between the charging roller and the photosensitive member based on Paschen's law, and the photosensitive member is charged with negative or positive charges in accordance with the applied voltage. The discharge is generated by neutral air that is ionized in the electric field, hence charges having the opposite polarity are also generated at the same time. In other words, the positive or negative charges having opposite polarity of discharge are moved toward the surface of the charging member by the electric field. In a state where no dirt substances adhere to the surface of the charging roller, the charges on the surface of the charging roller normally leak to the conductive support member side because of the conductivity of the charging roller, even if the surface of the charging roller is charged up with charges having an opposite polarity.

However if dirt substances (e.g. toner, external additives) having insulation properties adhere to the surface of the charging roller, the charges having opposite polarity of discharge moving toward the surface of the charging member, are trapped on the surface without leaking to the conductive member. Here charges having opposite polarities exist between the dirt substances charged with opposite polarity of the discharge (charged with the opposite polarity of the voltage applied to the charging member), and the surface of the charging member around the area where the dirt substances adhere, hence a very strong electric field is generated. This very strong electric field may, in some cases, generate an abnormally strong discharge.

Therefore if the charges, which are charged up due to adhering dirt substances, can be moved toward the conductive support member side, the abnormally strong charges may not be generated, and accordingly white spot images may not be generated.

In Japanese Patent Application Publication No. 2022-076450, the voltage is respectively applied to a first rubber, a first conductive particle, and a domain in the matrix in a shared manner (hereinafter referred to as "shared voltage"). However, since the first conductive particle in the matrix is a conductor and is present alone, the shared voltage applied to the first conductive particle is significantly low, and most of the voltage applied to the conductive layer containing the first conductive particles is applied to the first rubber and domains in the matrix.

As a result, the charge supply between domain-domains or between the domain and the first conductive particle is performed rapidly. Then, the charges consumed by discharging can be supplied more rapidly using the charges accumulated in the domain before the next discharging timing. As stated above, the charge of the opposite polarity to the charge bias of the dirt substance adhering to the surface of the charging member can be eliminated, and the occurrence of excessive discharging can be suppressed.

However, the present inventors have recognized that, in the high-speed process, the means for improving the charge transport performance in the conductive layer disclosed in Japanese Patent Application Publication No. 2022-076450 increases the amount of charge injected in the drum contact region and generates white blur images.

Injection charging is a phenomenon in which charge is transferred from the charging member to the photosensitive drum at the contact point with the photosensitive drum in accordance with the charging bias. The injection charging is a phenomenon that is directly related to charge transportability, and the irregular contact area between the charging member and the photosensitive drum may cause an irregular injection charging amount and may further cause an irregular surface potential of the photosensitive drum.

Not only in a drive rotation system in which a contact surface with a drum tends to increase due to a difference in peripheral speed between the charging member and the photosensitive drum but also in a system in which a driven rotation is performed, an irregular injection charging amount due to minute irregular contact area may appear on an image as white blur images in a high-speed process.

Even if the charging member is designed to make the contact pressure in the rotational direction and the longitudinal direction uniform, the charging member has a certain shape variation, which causes an irregular contact area. Meanwhile, since there are limits to the precision of shape, it is necessary to take measures to fundamentally suppress white blur images by designing the conductive layer.

Regarding the injection charging at the contact region of the photosensitive drum and the charge transportability at the non-contact region, the present inventors have focused on differences in potential and proceeded studies. First, at the contact region of the photosensitive drum, the photosensitive drum is in a state of being charged to several hundred volts by discharging. Furthermore, at the contact region between the charging member and the photosensitive drum, an actual contact area is 10% or less with respect to the contact area calculated from the contact width and the longitudinal direction due to unevenness on the surface of the charging member, and the gaps with large resistance have a shared voltage. Thus, the potential difference at the contact region is as low potential difference as several volts or less. When the charge transportability is high at this low potential difference, injection charging occurs from the charging member to the photosensitive drum. That is, at the contact region of the photosensitive drum, which has a low potential difference, it is necessary to suppress charge conductivity and reduce the injection charging.

Meanwhile, the region excluding the contact region is a portion to which a high electric field for discharging is applied or a non-discharging region not facing the drum, which is in a state where a potential of at least 10 V, and in some cases as high as 1000 V, is applied. Therefore, when the charge transportability of the conductive layer is high at this high potential difference, it is possible to eliminate static electricity from dirt.

That is, it was conceived that it would be possible to design a conductive layer that can achieve the suppression of both white spot images and white blur images if injection charging can be reduced by suppressing charge transportability under a low potential difference and, further, charge-up on dirt can be suppressed by promoting charge transportability under a high potential difference.

As a result of intensive studies, the present inventors have found that suppression of white spot images and white blur images can be solved by the electrophotographic member described below.

That is, the present disclosure relates to an electrophotographic member comprising:

a support member having a conductive outer surface; and
 a conductive layer disposed on an outer surface of the support member, wherein
the conductive layer comprises
 a matrix comprising a first rubber, and
 at least one domain dispersed in the matrix;
volume resistivity of the matrix is $1.00\times10^{8}$ to $1.00\times10^{12}$ Ω·cm;
the at least one domain comprises a domain A comprising a second rubber and an electronic conductive agent;
the conductive layer further comprises an insulating region comprising a third rubber;
a volume resistivity of the insulating region is greater than $1.00\times10^{12}$ Ω·cm;
in a case where a platinum electrode is directly disposed on an outer surface of the electrophotographic member and impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode,
impedance X at a frequency of $1.0\times10^{-1}$ Hz is $1.00\times10^{6}$ to $1.00\times10^{8}$Ω; and
in a case where impedance is measured while a DC voltage of 10 V and an AC voltage of 1 V in amplitude are applied in a superimposed manner between the outer surface of the support member and the platinum electrode,
a relationship between impedance Y at a frequency of $1.0\times10^{-1}$ Hz and the impedance X satisfies an expression (1) below:

$$X/Y \geq 7.5. \qquad (1)$$

In the conductive layer having a domain matrix structure, the volume resistivity ρm of the matrix is from $1.00\times10^{8}$ Ω·cm to $1.00\times10^{12}$ Ω·cm. The conductive layer has an insulating region with a volume resistivity of greater than $1.00\times10^{12}$ Ω·cm. Charge transportability is controlled at the interface between these matrix and insulating regions.

With respect to the charge-up on dirt adhering to the surface of the charging member, a matrix having a volume resistivity of $1.00\times10^{12}$ Ω·cm or less does not limit the transport of charges only within the domain but allows charges to be moved within the matrix. As the degree of freedom of charge in the matrix increases, the amount of injection charging into the photosensitive drum increases. Nevertheless, the trade-off can be eliminated by introducing an insulating region having a volume resistivity greater than $1.00\times10^{12}$ Ω·cm into the matrix.

The present inventors have inferred the reasons why this trade-off was improved as follows. A minute energy barrier is formed at the interface between the matrix having a volume resistivity of $1.00\times10^{12}$ Ω·cm or less and the insulating region having a volume resistivity of more than $1.00\times10^{12}$ Ω·cm, and when the driving force of charges due to an electric field is weak, charges do not exceed the interface.

On the other hand, if the electric field is large, charges can move beyond the energy barrier at the interface. That is, injection charging can be suppressed by suppressing excessive transportability of charge at a low potential difference. Simultaneously, charge transport can be promoted at a high potential difference.

The present inventors also found that the charge transportability described above is suitably expressed within the range of impedance characteristics as stated below.

A general impedance measurement is a method of measuring characteristics of the difficulty of following the movement of the electric charge against oscillating voltage in the high frequency range (several hundred Hz to 1 MHz) while gradually increasing the frequency.

In the measurement while applying a low-frequency voltage, it can be assumed that the amount of charge transfer is simulated in a state where the movement of the charge can follow the oscillation of the voltage. Accordingly, the amount of the movement of the charge at a low frequency is an indicator of ease of charge movement between the charging member and the measurement electrode and further can be an indicator of charge amount that allows the charge to be moved from the surface of the charging member to the photosensitive drum by discharging.

The inventors have found that the characteristics correlating with the injection charging occurring at the drum contact region with a low potential difference and the phenomenon of eliminating static electricity from dirt occurring at a high potential difference correlate with the impedance characteristics in the low frequency region when the DC voltage is changed.

Specifically, a platinum electrode is directly disposed on an outer surface of the electrophotographic member, and the impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode. At this time, the impedance X (the absolute value X of the impedance) at a frequency of $1.0\times10^{1}$ Hz is $1.00\times10^{6}$ to $1.00\times10^{8}$ Ω.

The measurement of the DC voltage of 1 V is a measurement corresponding to the injection charging phenomenon at the contact region of the photosensitive drum. The impedance X of at least $1.00\times10^{6}$ Ω achieves the range in which injection charging can be suitably suppressed. The impedance X is preferably $1.00\times10^{8}$ Ω or less for the reason of suppressing charging failure due to the high resistance of the conductive layer.

The measurement of the impedance Y while a DC voltage of 10 V and an AC voltage of 1 V in amplitude are applied in a superimposed manner is a measurement corresponding to a transport phenomenon of charge at a high potential difference at a discharge part or a segment where the photosensitive drum and the charging roller do not face each other.

The impedance X and the impedance Y satisfy the relationship of the following expression (1).

$$X/Y \geq 7.5 \tag{1}$$

When the X/Y is 7.5 or more, the drum contact region with a low potential difference becomes highly resistive, making it difficult for electric charges to move and suppressing injection charging. At the same time, since the resistance is low in the region with a high potential difference, a charge transport phenomenon can be promoted, and white blur images can be suppressed.

As described above, it is believed that by satisfying the specific relationship between the impedance X and the impedance Y while controlling the volume resistivity between the matrix and the insulating region, both suppression of injection charging at a low potential difference and suppression of charge-up on dirt at a high potential difference can be achieved, and white spot images and white blur images can be suppressed simultaneously.

Also, in order to further suppress injection charging and further improve the charge transportability for eliminating charge-up on dirt, the impedance X is preferably $4.00\times10^{6}$ to $6.50\times10^{7}$ Ω.

The impedance X can be increased, for example, by selecting a polar polymer in the matrix, extending the mixing time, controlling the release temperature to be high, and increasing the amount of fillers. The impedance X can be reduced by selecting a non-polar polymer in the matrix, lowering the release temperature, and controlling the mixing time to be short as appropriate.

In a similar view, it is preferred that the impedance Y and the impedance X satisfy the following expression (2), and it is more preferred to satisfy the expression (2-2).

$$20.0 \geq X/Y \geq 7.5 \tag{2}$$

$$18.0 \geq X/Y \geq 7.5 \tag{2-2}$$

X/Y can be controlled by the selection of a polymer for the matrix, the mixing time, and the selection of the release temperature, and the presence of the insulating domains. For example, by selecting a polar polymer for the matrix, extending the mixing time, and setting the release temperature to be high, the X/Y is likely to increase. Furthermore, X/Y is likely to increase by the presence of an insulating domain.

Method of Measuring Impedance

The impedance can be measured by the following method.

When measuring impedance, it is necessary to eliminate the influence of the contact resistance between the electrophotographic member and the measurement electrode. For this purpose, platinum in the form of a low-resistance thin film is deposited on the surface of an electrophotographic member, and the resulting thin film is used as an electrode. Then, the impedance is measured with two terminals using a support member of electrophotography as a ground electrode.

Examples of methods for forming the electrode may include methods for forming electrodes, such as metal vapor deposition, sputtering, application of metal paste, attachment of a metal tape, and the like. Among these, from the viewpoint of reducing contact resistance with an electrophotographic member, a platinum thin film is formed as a platinum electrode by vapor deposition in the present disclosure.

In the case of forming a platinum electrode on the surface of an electrophotographic member, a mechanism capable of gripping the electrophotographic member is provided to a vacuum vapor deposition apparatus in consideration of its simplicity and uniformity of a thin film. For the electrophotographic member having a cylindrical cross-section, it is preferable to use a vacuum deposition apparatus provided with a rotating mechanism. For an electrophotographic member constituted by curves, such as an electrophotographic member having a circular cross-section, for example, a cylindrical electrophotographic member, the following method is preferably used because it is difficult to connect the platinum electrode as the measurement electrode with the measuring apparatus of impedance.

Specifically, after a platinum electrode having a width of about 10 mm to about 20 mm is formed in the longitudinal direction of the electrophotographic member, a metal sheet is wound without a gap, and then the metal sheet and a measurement electrode from a measuring instrument are connected to perform the measurement. Thus, the electrical signal from the conductive layer of the electrophotographic member can be suitably acquired in the measuring apparatus, and impedance measurement can be performed. The metal sheet may be a metal sheet having an electrical resistance value equivalent to that of the metal portion of the connection cable of the measuring apparatus when measuring impedance, and, for example, aluminum foil, metal tape, or the like may be used.

The apparatus for measuring impedance may be an apparatus that can measure impedance in the frequency range up to $1.0\times10^{7}$ Hz, such as an impedance analyzer, a network analyzer, a spectrum analyzer, or the like. Among these, it is preferable to measure impedance by an impedance analyzer in view of the electrical resistance range of the electrophotographic member.

The impedance measurement conditions will be described. An impedance measurement apparatus is used to measure the impedance in the frequency region of $1.0\times10^{-2}$ Hz to $1.0\times10^{7}$ Hz. The measurement is performed under an environment at a temperature of 23° C. and a humidity of 50% RH. In order to reduce measurement variations, it is preferable to provide five or more measurement points per digit of frequency. The amplitude of the AC voltage is 1 V.

In the present disclosure, a low potential difference at the contact region of a photosensitive drum and a high potential difference at a non-contact region and a non-discharge portion are assumed, and measurement is performed while superimposing a DC voltage with an AC voltage. Specifically, impedance may be measured while a DC voltage of 1 V or 10 V, the vibration voltage of 1 V, and the frequency of $1.0\times10^{-1}$ Hz are applied in a superimposed manner.

An arithmetic mean at five measurement positions is employed as impedance. For example, the positions of five positions are set at equal intervals so as not to be arbitrary. Depending on the shape of the conductive layer, if the conductive layer can be equally divided into five portions, for example, samples are taken from the central portion of each of the five divided portions. In the impedance measurement of the roller-shaped or cylindrical electrophotographic member, impedance may be measured at five central portions in the respective regions when the length in the axial direction (the longitudinal direction) is divided into five equal portions, and the arithmetic average of the measured values of the inclinations at the five positions may be calculated.

Electrophotographic Member

The electrophotographic member includes a support member having a conductive outer surface, and a conductive layer disposed on the outer surface of the support member. FIG. 1 schematically shows an external view of a charging member (hereinafter referred to as a charging roller) as an electrophotographic member. The charging roller has a constitution provided with a conductive layer 2 on the outer periphery of a support member 1 having a conductive outer surface. Both ends of the support member 1 are exposed without being covered with the conductive layer 2. The conductive layer 2 may be a single-layer structure as a conductive elastic layer, or may have one or plural conductive resin layers on the outer peripheral surface of the elastic layer.

Support Member Having Conductive Outer Surface

The support member 1 used in an electrophotographic member has conductivity and functions to support a conductive layer or the like provided on the outer periphery of the support member 1. Examples of the material may include metal such as iron, copper, stainless steel, aluminum, and nickel, and alloys thereof. For the purpose of imparting scratch resistance to these surfaces, plating treatment or the like may be applied. Furthermore, as the support member, a support member obtained by coating the surface of a resin substrate with a metal or the like to impart surface conductivity, or a support member manufactured from a conductive resin composition can also be used.

An adhesive layer (not shown) may be provided between the support member 1 and the conductive layer 2. In this case, the adhesive is preferably conductive. In order to make the adhesive conductive, known conductive agents (for example, an ionic conducting agent or an electronic conductive agent) can be selected, as appropriate, for the adhesive and may be used alone or in combination of two or more types of adhesives.

Examples of binders for the adhesive may include a thermosetting resin and a thermoplastic resin, and known adhesives such as urethane-based, acrylic-based, polyester-based, polyether-based, or epoxy-based known adhesives may be used. As the adhesive, commercially available ones may be used, and examples thereof may include METALOC N33 (manufactured by Toyo Chemical Laboratory Co., Ltd.). As a method of applying the adhesive, known methods such as roll coater, sponge coating, spray coating, and the like may be used.

The adhesive layer between the support member 1 and the conductive layer 2 may be provided over the entire region of the surface where the support member 1 and the conductive layer 2 are in contact, or the adhesive layer may be provided only in the range of 5 mm to 20 mm in width at both ends of the surface where the support member 1 and the conductive layer 2 are in contact. The thickness of the adhesive layer is preferably 1 μm to 10 μm from the viewpoint of the adhesion between the support member and the conductive layer.

Conductive Layer

The conductive layer needs to satisfy the following requirements in order to simultaneously suppress both white spot images and white blur images.

(Condition 1) The conductive layer has a matrix containing a first rubber and at least one domain dispersed in the matrix, the volume resistivity ρm of the matrix is $1.00\times10^{8}$ to $1.00\times10^{12}$ Ω·cm, and the at least one domain includes a domain A that includes a second rubber and an electronic conductive agent.

(Condition 2) The conductive layer further has an insulating region containing a third rubber, and the volume resistivity of the insulating region is greater than $1.00\times10^{12}$ Ω·cm.

The above conditions will be described.

Regarding Condition 1

By setting the volume resistivity ρm of the matrix to $1.00\times10^{12}$ Ω·cm or less, the effect of eliminating the charge-up on dirt substances adhering to the surface of the charging member can be obtained. Since the charge-up on dirt substances has a polarity opposite to the charge bias, the degree of freedom of matrix charge is improved by setting the volume resistivity in the range described above, and the charge-up can be transported toward a support member having a conductive outer surface and eliminated.

The volume resistivity ρm of the matrix is set to $1.00\times10^{8}$ Ω·cm or more. If ρm is less than the lower limit mentioned above, the conductivity of the matrix is increased, charge transfer between the conductive domains is promoted excessively, and an excessive current tends to flow, and even in a state where the insulating region under condition 2 is introduced, white blurs caused by injection charging may occur.

The volume resistivity ρm of the matrix is preferably $4.00\times10^{8}$ to $1.00\times10^{10}$ Ω·cm. The volume resistivity ρm of the matrix can be increased, for example, by reducing the polarity of the polymer. Also, the volume resistivity ρm of the matrix can be reduced, for example, by increasing the polarity of the polymer, or by reducing the viscosity of the matrix polymer.

Method of Measuring Volume Resistivity ρm of Matrix

The volume resistivity ρm of the matrix may be measured, for example, by cutting out a thin slice of a predetermined thickness (for example, 1 μm) including a matrix domain structure from the conductive layer, and bringing a microprobe of a scanning probe microscope (SPM) or an atomic force microscope (AFM) into contact with the matrix in the thin slice.

Figure 2A:
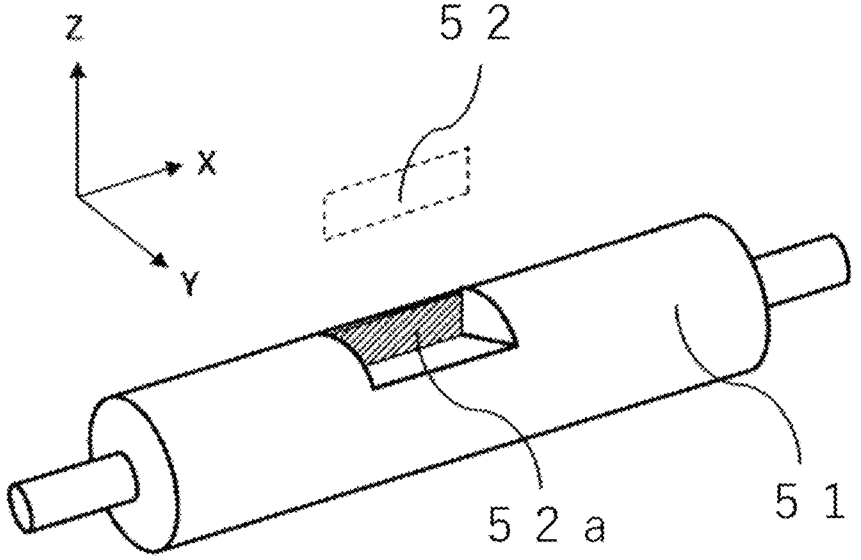
FIGS. 2A and 2B are explanatory views of the cutting direction of a cross-section.
Figure 2B:
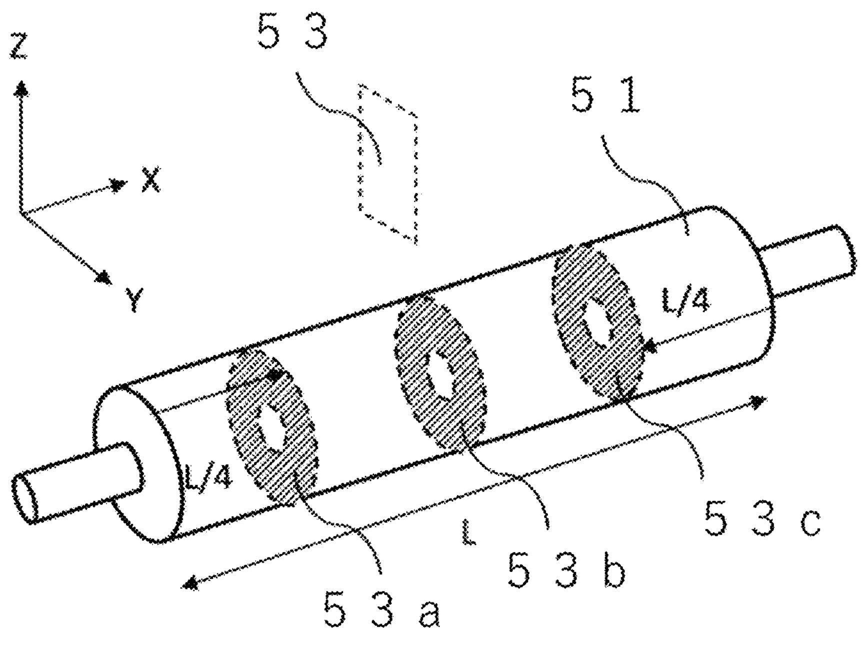

For example, as shown in FIG. 2A, a thin slice is cut out from a conductive layer so that a thin film 52 includes at least a part of a cross-section 52*a* parallel to the XZ plane when the longitudinal direction of the electrophotographic member 51 is taken as X-axis, the thickness direction of the conductive layer is taken as Z-axis, and the circumferential direction is taken as Y-axis. Alternatively, as shown in FIG. 2B, the thin slice is cut out so that the thin slice includes at least a part of a YZ plane (for example, 53*a*, 53*b*, and 53*c*) perpendicular to the axial direction of the electrophotographic member 51. In the present disclosure, a shin slice was cut out as shown in 2B.

Examples of cutting methods may include a method using a sharp razor, a microtome, or a focused ion beam (FIB) method. A microtome was employed in the present disclosure.

The volume resistivity is measured as follows. First, one surface of the thin slice cut out from a conductive layer is grounded. Next, the microprobe of a scanning probe microscope (SPM) or an atomic force microscope (AFM) is brought into contact with the portion of matrix on the surface of the thin slice opposite to the grounded surface, then a DC voltage of 50 V is applied for 5 seconds, an arithmetic mean value is calculated from the value of the ground current value measured for 5 seconds, and the applied voltage is divided by the calculated value to calculate the electric resistance value. Finally, the film thickness of the shin slice is used to convert the resistance value into volume resistivity. At this time, the film thickness of the thin slice can also be measured by the SPM and the AFM simultaneously with the resistance value. Specific procedures will be described later.

First Rubber

The matrix includes a first rubber. The matrix includes, for example, a crosslinked product of a first rubber. The first rubber is a component forming the matrix in a rubber mixture for forming conductive layers. By setting the volume resistivity ρm of the matrix to $1.0\times10^{12}$ Ω cm or less, the electrostatic charge of the dirt substance adhering to the surface of the electrostatic charging member can be removed. Furthermore, a rubber that can phase separate from the second rubber described below to form a matrix-domain structure is used as the first rubber. The crosslinked product of rubber governs the mechanical strength of the conductive layer. Accordingly, the first rubber preferably exhibits the strength required for the conductive member for electrophotography in the conductive layer after crosslinking.

For example, a rubber material listed below may be employed as the first rubber. Examples of the first rubber may include at least one selected from the group consisting of natural rubber, butadiene rubber, butyl rubber, acrylonitrile-butadiene rubber, urethane rubber, silicone rubber, fluorocarbon rubber, isoprene rubber, chloroprene rubber, styrene-butadiene rubber, ethylene-propylene rubber, polynorbornene rubber, chloroprene rubber (CR), acrylonitrile-butadiene rubber (NBR), hydrogenated NBR (H-NBR), and epichlorohydrin rubber. Among them, the first rubber preferably contains at least one selected from the group consisting of a chloroprene rubber (CR) and an acrylonitrile-butadiene rubber (NBR), and more preferably contains NBR. It is still more preferable that the first rubber is NBR.

Also, if necessary, the matrix may contain a filler, a processing aid, a crosslinking agent, a crosslinking aid, a crosslinking accelerator, a crosslinking acceleration aid, a crosslinking retarder, an anti-aging agent, a softening agent, a dispersing agent, a colorant, and an electronic conductive agent. In order to make the volume resistivity of the matrix within the above range, it is preferable that the matrix does not contain an electronic conductive agent such as carbon black.

Domain a Having Second Rubber

At least one domain includes a domain A that contains a second rubber and an electronic conductive agent. That is, the second rubber is a rubber forming the domain A that contains an electronic conductive agent. The domain may contain a crosslinked product of a second rubber. The domain A will be described later. The volume resistivity pd of the domain A is preferably $1.00\times10^{1}$ to $1.00\times10^{4}$ Ω·cm, more preferably $1.00\times10^{1}$ to $1.00\times10^{2}$ Ω·cm, and still more preferably $1.00\times10^{1}$ to $7.00\times10^{1}$ Ω·cm in order to achieve uniform conductivity by a domain matrix.

The second rubber may be any rubber material that is obtained by adding an electronic conductive material and has a volume resistivity within the above range and, for example, the following rubber materials may be mentioned. For example, at least one selected from the group consisting of natural rubber (NR), isoprene rubber (IR), butadiene rubber (BR), acrylonitrile-butadiene rubber (NBR), styrene-butadiene rubber (SBR), butyl rubber (IIR), ethylene-propylene rubber (EPM), ethylene-propylene-diene rubber (EPDM), chloroprene rubber (CR), nitrile rubber (NBR), hydrogenated nitrile rubber (H-NBR), silicone rubber, and urethane rubber (U) is preferred.

The second rubber preferably contains at least one rubber selected from the group consisting of SBR, EPDM, and IR, and it is more preferred that the second rubber is at least one rubber selected from the group consisting of SBR, EPDM, and IR.

(Condition 2) The conductive layer has an insulating region having the volume resistivity of greater than $1.00\times 10^{12}$ Ω·cm, including a third rubber.

As described above, a matrix having a volume resistivity of $10\times10^{12}$ Ω·cm or less and an insulating region of greater than $1.00\times10^{12}$ Ω·cm are made present in the conductive layer. It is inferred that, with this configuration, a minute energy barrier is formed at the interface between both, and a state where the charge cannot exceed the interface occurs when the driving force of the charge by the electric field is weak.

Meanwhile, if the electric field is large, a configuration in which charges can move beyond the energy barrier at the interface can be achieved. That is, injection charging can be suppressed by suppressing excessive charge transportability at a low potential difference. Simultaneously, the transport of charge can be promoted at a high potential difference.

The volume fraction of the insulating region based on the sum of the matrix and the insulating region is preferably from 50% to 90%. When the volume fraction is 50% or more, the interfacial area in the matrix increases, and the injection charging at the drum contact region can be suppressed. When the volume fraction is 90% or less, the volume resistance of the entire conductive layer can be increased, and a phenomenon in which the transportability of the charge is greatly reduced can be suppressed, which is thus preferable.

As described above, the insulating region should be within the range that can form an interface with the matrix, and may be in a co-continuous structure with the matrix or may exist as domains in the matrix.

The insulating region in the matrix is preferably a domain structure in the matrix in order to uniformly express the suppression of the transport of charge at low potential differences and the promotion of charge transport at high potential differences in the conductive layer. Hereinafter, the domain of the isolation in the matrix will be referred to as domain B. That is, it is preferred that at least one domain includes a domain B constituting the insulating region. The insulating region is preferably an insulating region constituted by the domain B.

Furthermore, the studies clarified that the abundance ratio and uniform arrangement of the conductive domain A and the insulating domain B in the conductive layer suitably correlate. Specifically, the matrix domain structure in the conductive layer and the conductive portion and the insulating region in the domain may be determined three-dimensionally by measurement using the FIB-SEM.

The "FIB-SEM" is a method for observing a cross-section of a sample, which is processed and exposed by a focused ion beam (FIB) apparatus, using a scanning electron microscope (SEM). In order to examine the three-dimensional structure, it is possible by repeating continuous processing and observation to acquire many photos and then subjecting the SEM image to 3D reconstruction processing with computer software to construct the sample structure as a three-dimensional stereo image.

Specifically, first, the conductive layer is sampled from 9 points of the conductive layer. The 9 positions are selected at equal intervals so as not to be arbitrary. Depending on the shape of the conductive layer, for example, if the conductive layer can be equally divided into 9 portions, samples are taken from the central portion of each of the 9 divided portions.

When the electrophotographic member is in the form of a roller, when the length in the axial direction (longitudinal direction) is taken as L, three positions (1/4) L, (2/4) L, and (3/4) L from the end are set every 120° intervals in the circumference direction of the roller, and a single sample is cut from each of these positions.

After that, three-dimensional measurement is performed using the FIB-SEM, and images of a cube shape with a side length of 3 μm are measured at an interval of 60 nm. Here, the cross-sections of the conductive layer in each cross-section at (1/4) L, (2/4) L, and (3/4) L are measured every 120° intervals in the circumferential direction of the roller and at the center of the surface from the core metal position.

The resulting images were then analyzed using the 3D visualization and analysis software Avizo (registered trademark, manufactured by FEI Company Japan Ltd.). One sample in a cube shape with a side length of 9 μm was divided into 27 unit cubes with a side length of 3 μm.

Figure 4A:
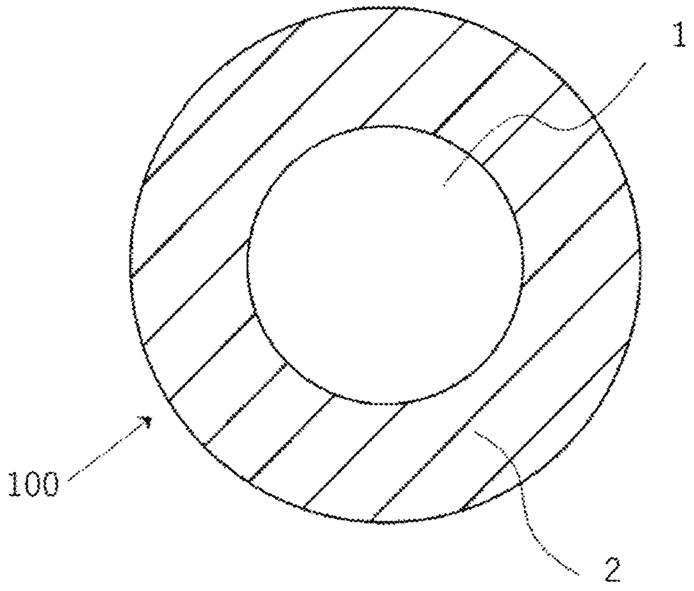
FIGS. 4A and 4B are schematic diagrams for sampling 9 points of a conductive layer.
Figure 4B:
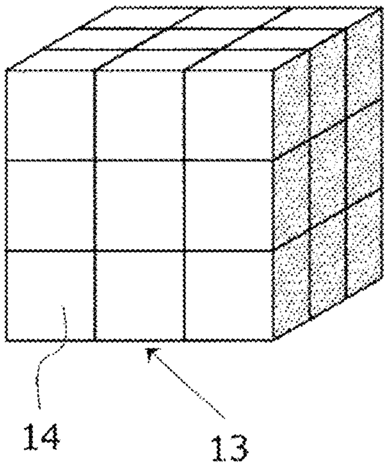

One example is shown in FIGS. 4A and 4B. The electrophotographic member 100 has a conductive layer 2 having a matrix containing a crosslinked product of a first rubber and a plurality of domains dispersed in the matrix on a conductive support member (conductive shaft core) 1. It is noted that other layers may be provided on the conductive layer if necessary. A cube-shaped first sample 13 with a side length of 9 μm sampled from 9 points of the conductive layer is obtained. The sample is divided into 27 unit cubes 14 with a side length of 3 μm. The obtained unit cubes 14 are evaluated.

That is, it is preferred that at least 8 samples out of cube-shaped samples with a side length of 9 μm sampled from 9 points of the conductive layer satisfy the condition (A) below:

(A) in a case where one sample is divided into 27 unit cubes with a side length of 3 μm, and a volume Vd of the domains included in the unit cube is determined, the number of the unit cubes with a Vd of 2.7 to 10.8 $\mu m^3$ is at least 23.

Satisfying the condition (A) shows that the domains are uniformly arranged, and the effect of suppressing injection charging at low potential differences and suppressing the charging up on dirt at high potential differences can be suitably expressed.

In order to satisfy the condition (A), for example, a method of reducing the domain size and making the domains more finely dispersed can be mentioned.

For condition (A), the domains on which Vd is to be determined include both the domain A and the domain B. The domain contained in the cube-shaped sample indicates one in which the entire domain is contained in the cube-shaped sample, one in which only part of the domains is contained in the cube-shaped sample, or both. At this time, the target to be counted as a domain is counted if the target partially contains a domain in a cube-shaped sample.

Figure 3:
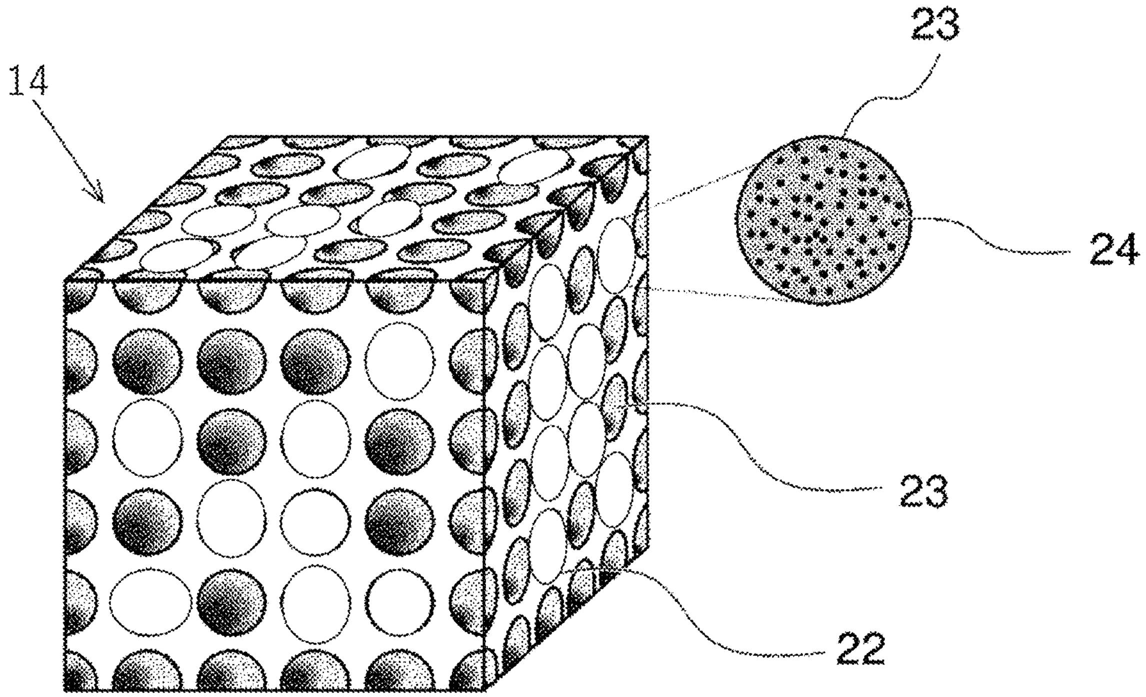
FIG. 3 is a view for explaining a conductive layer structure.

FIG. 3 illustrates a view for explaining the structure of a conductive layer having a matrix and a plurality of domains dispersed in the matrix. FIG. 3 is a schematic view of the unit cube 14. For example, the unit cube 14 has an insulating domain 22 and a conductive domain 23. The conductive domain 23 has a conductive particle 24.

The volume resistivity ρm of the matrix is set to $1.0\times10^{12}$ Ω cm or less to reduce the degree of freedom of charge transportability. The main conduction in the conductive layer is preferably hopping conduction performed along the conductive domain A.

Accordingly, it is preferred that at least 8 samples satisfying the condition (A) satisfy the following condition (B).

(B) The proportion of the number of the domain A in the total number of domains (hereinafter also simply referred to as the proportion of the domain A) accounts for 10 to 50 number %.

When the proportion of the domain A is within the above range, the interfacial area of the insulating region in the matrix becomes more suitable, and the effects of injection charging suppression and charge-up suppression can be more suitably expressed.

Furthermore, it is more preferred that at least 8 samples satisfying the condition (A) satisfy the following (B2).

(B2) The proportion of the number of the domain A in the total number of domains accounts for 30 to 40 number %.

By satisfying the condition (B2), the effect of suppressing injection charging at low potential differences and suppressing the charge up on dirt at high potential differences can be further suitably expressed.

The proportion of the domain A can be increased by increasing the blending amount of the electronic conductive material added to the domain, increasing the amount of the conductive domain added, and raising the release temperature during mixing the domain A. Furthermore, the proportion of the domain A can be reduced by the reduction of the amount of the electronic conductive material or the reduction of the amount of the conductive domain added.

Meanwhile, the proportion of the number of the domains B in the total number of domains is preferably 50 to 90 number % and more preferably 60 to 70 number %.

In a cubic-shaped sample with one side of 9 μm, which is sampled from 9 points of the conductive layer, the average number of the domains A per sample is preferably 30 to 500, more preferably 180 to 350.

In a cubic-shaped sample with a side length of 9 μm sampled from 9 points of the conductive layer, the average number of the domain B per sample is preferably 200 to 1000 and more preferably 250 to 800.

Third Rubber

The conductive layer has an insulating region containing a third rubber, and the volume resistivity ρI of the insulating region is greater than $1.00\times10^{12}$ Ω·cm. The insulating region includes, for example, a crosslinked product of a third rubber. The insulating region limits the transport of charge at a low potential difference and promotes the transport of charge at a high potential difference at an interface with a matrix having a volume resistivity of $1.00\times10^{12}$ Ω·cm or less. If the volume resistivity of the insulating region is lower than that of the first rubber of the matrix, it becomes difficult to suppress injection charging due to a low potential difference at the contact region of the photosensitive drum.

Here, the term "insulation" means that the volume resistivity is greater than $1.00\times10^{12}$ Ω·cm. The volume resistivity μI of the insulating region is preferably, for example, $1.00\times10^{14}$ to $1.00\times10^{17}$ Ω·cm.

Preferred examples of the third rubber are listed below.

Natural rubber (NR), isoprene rubber (IR), butadiene rubber (BR), styrene-butadiene rubber (SBR), butyl rubber (IIR), ethylene-propylene rubber (EPM), ethylene-propylene-diene rubber (EPDM), silicone rubber, and the like can be mentioned.

The third rubber preferably contains at least one rubber selected from the group consisting of SBR, EPDM, and IR, and it is more preferred that the third rubber is at least one rubber selected from the group consisting of SBR, EPDM and IR.

Size of Conductive Domain A With regard to the domain diameters of the domain A and the domain B, it is preferred that the domain diameter of the domain A dispersed in the matrix is 0.2 to 2.0 μm. It is also preferred that the domain diameter of domain B is 0.2 to 2.0 μm. Here, the domain diameter specifically refers to the maximum Feret diameter of the domain in the conductive phase.

By setting the domain diameter of the domain A to be 2.0 μm or less, uniform conductivity can be obtained by the domain matrix structure, and a phenomenon in which excessive current is generated at a place where conductivity is locally uneven and injection charging is promoted can be more efficiently suppressed.

By setting the domain diameter of the domain A to be 0.2 μm or more, charges are accumulated as a whole by the insulating region having the third rubber, and a proper discharge amount as a charging member is secured, and a phenomenon in which a charging failure occurs can be suppressed.

The means for controlling the domain size will be described later as a description relating to the control of the domain matrix structure.

Method of Measuring Volume Proportion and Number of Domain a and Insulating Region (Domain B)

The matrix domain structure, the domain volume proportion, and the number of domains in the conductive layer can be determined three-dimensionally using FIB-SEM.

The "FIB-SEM" is a method for observing a cross-section of a sample, which is processed and exposed by a focused ion beam (FIB) apparatus, using a scanning electron microscope (SEM). In order to examine the three-dimensional structure, it is possible by repeating continuous processing and observation to acquire many photos and then subjecting the SEM image to 3D reconstruction processing with computer software to construct the sample structure as a three-dimensional stereo image.

Specific procedures will be described later.

Electronic Conductive Agent

The electronic conductive agent blended in the domain A may include carbon black, graphite, an oxide such as titanium oxide or tin oxide; a metal such as Cu or Ag; particles in which oxides or metal are coated on the surface to be made conductive; and the like. Furthermore, two or more of these conductive agents may be blended in an appropriate amount as necessary. The electronic conductive agent preferably contains carbon black or tin oxide, more preferably contains carbon black, and still more preferably is carbon black.

Among the electronic conductive agents stated above, it is preferable to use conductive carbon black that has a large affinity with rubber and is easy to control the distance between the electronic conductive agents. The type of carbon black blended in the domains is not particularly limited. Specific examples thereof may include gas furnace black, oil furnace black, thermal black, lamp black, acetylene black, Ketjenblack, and the like.

Among others, conductive carbon blacks having a DBP absorption of from 40 $cm^3$/100 g to 170 $cm^3$/100 g, which can impart high conductivity to the domains, may be suitably used.

The content of the electronic conductive agent such as conductive carbon black is preferably from 20 to 150 parts by mass with respect to 100 parts by mass of the second rubber included in the domain in view of exhibiting stable conductivity. More preferably, the amount of the electronic conductive agent is from 50 to 100 parts by mass.

As compared with common electrophotographic members for electrophotography, it is preferred that the conductive agent is blended in a large amount. Thus, the volume resistivity of the domain can be easily controlled within a range of from $1.00\times10^{1}$ Ωcm to $1.00\times10^{4}$ Ω·cm. Furthermore, the resistance can be increased by raising the release temperature during mixing.

In a step for preparing a rubber mixture for conductive domains (hereinafter also referred to as "DRC-A") described later, it is preferable to set the rubber release temperature to about 115° C. to 180° C.

Method of Manufacturing Electrophotographic Member

An example of a method for manufacturing an electrophotographic member is shown below. In this example, it is preferred that the manufacturing method includes the following steps (A) to (F), but is not particularly limited as long as the constitution of the present disclosure can be achieved.

- Step (A): A step of preparing a rubber mixture for conductive domains (hereinafter also referred to as "DRC-A") containing an electronic conductive agent, such as carbon black, and a second rubber;
- Step (B): A step of preparing a rubber mixture for insulating domains (hereinafter referred to as "DRC-B") containing a third rubber;
- Step (C): A step of preparing a rubber composition for forming matrices (hereinafter referred to as "MRC") containing a first rubber;
- Step (D): A step of preparing a rubber mixture for matrices and insulating domains (hereinafter referred to as "M-DRC") by mixing MRC and DRC-B;
- Step (E): A step of preparing a rubber mixture for forming a conductive layer having a matrix domain structure and conductive and insulating domain structures by kneading DRC-A and M-DRC;
- Step (F): A step of forming a layer of the rubber mixture for forming a conductive layer directly on a conductive support member or via another layer, and curing the layer of the rubber mixture to form a conductive layer.

Step (F) may be the following step (F2).

Step (F2): A step of forming a conductive layer on a conductive support member by known methods, such as extrusion molding, injection molding, or compression molding, using the rubber mixture for forming the conductive layer prepared in the steps (A) to (E).

Note that the conductive layer may be adhered to the conductive support member via an adhesive if necessary. The conductive layer formed on the conductive support member may be subjected to a vulcanization treatment if necessary, and may be subjected to a surface treatment such as ultraviolet treatment after polishing treatment.

When performing the vulcanization, a vulcanizing agent may be further added to the rubber mixture for forming the conductive layer in the step (F). Then, the rubber mixture may be vulcanized during the above curing. A vulcanizing agent is not particularly limited, and examples thereof may include sulfur and the like.

The amount of the second rubber relative to 100 parts by mass of the first rubber is preferably 50 to 200 parts by mass and more preferably 75 to 125 parts by mass.

The amount of the third rubber relative to 100 parts by mass of the first rubber is preferably 50 to 200 parts by mass and more preferably 75 to 125 parts by mass.

Method of Controlling Matrix Domain Structure

For the dispersed particle diameter (domain size) D when two non-compatible polymers are melt-kneaded, Taylor's Formula, Wu's empirical formula, and Tokita's formula indicated in the following expressions (4) to (7) have been proposed (see R&D Reports "SUMITOMO KAGAKU", 2003-II, 42).

Taylor's Formula $$D=\left[C\cdot\sigma/\eta m\cdot\gamma\right]\cdot f\left(\eta m/\eta d\right) \quad \text{Expression (4)}$$

Wu's Empirical Formula $$\gamma\cdot D\cdot\eta m/\sigma=4\left(\eta d/\eta m\right)0.84\cdot\eta d/\eta m>1 \quad \text{Expression (5)}$$

$$\gamma\cdot D\cdot\eta m/\sigma=4\left(\eta d/\eta m\right)-0.84\cdot\eta d/\eta m<1 \quad \text{Expression (6)}$$

In the expressions (4) to (7),

D: Domain size, C: Constant, σ: Interfacial tension,
ηm: Viscosity of the matrix, ηd: Viscosity of the domain,
γ: Shear Rate, η: Viscosity of the mixed system, P: Collision and Coalescence Probability, φ: Domain phase volume, EDK: Domain phase cleavage energy: are indicated.

From the above expressions, it is effective to control four of the following (a) to (d) relating to the dispersed state of domains.

(a) The difference in interfacial tensions a for each of the DRC-A, DRC-B, and MRC;
(b) A ratio (ηm/ηd) between the viscosity (ηd) of DRC-A or DRC-B, and the viscosity (ηm) of MRC;
(c) The shear rates (γ) during kneading of DRC-A, DRC-B, and MRC in the step (E) and the energy amount (EDK) during shearing.
(d) The volume fraction of DRC-A or DRC-B relative to MRC in the step (E).

(a) Difference in Interfacial Tension a of Each Rubber Material

Generally, when two incompatible rubbers are mixed, phase separation occurs. This is because the interaction between the same polymers is stronger than the interaction between heterogeneous polymers, and thus, the same polymers are aggregated to reduce the free energy to be stabilized.

Since the interface of the phase-separated structure is in contact with a heterogeneous polymer, the free energy is higher than the inside, which is stabilized by the interaction of the same molecules. As a result, an interfacial tension is generated to reduce the area in contact with the heterogeneous polymer in order to reduce the free energy at the interface. If this interfacial tension is low, it goes in a direction in which even heterogeneous macromolecules are more uniformly mixed to increase the entropy. The uniformly mixed state is dissolution, and the SP value (solubility parameter), which is a measure of solubility, and the interfacial tension tend to correlate with each other. The way of measuring SP values will be described later.

The SP value can be controlled by the selection of raw material rubbers or the like for the matrix and domains. If the difference in the absolute values of the solubility parameters between the first and second rubbers is 0.4 to 4.0 $(J/cm^3)^{0.5}$, a stable phase-separated structure can be formed. The difference is preferably 0.4 to 2.2 $(J/cm^3)^{0.5}$.

With this range, a stable phase-separated structure can be formed, and the maximum Feret diameter of the domain can be easily controlled to 0.2 to 2.0 μm.

It is also known that when three or more incompatible rubber materials are mixed, the dispersion state thereof takes a variety of dispersion states depending on the SP value of the constituting rubber materials.

If the domain forms a conductive layer having a matrix-domain structure with an insulating region, a constitution in which the rubber material containing an electronic conductive agent has a greater SP value than other rubber materials, or a combination in which the rubber material containing an electronic conductive agent has a smaller SP value than other rubber materials is preferable.

Meanwhile, the values of SP are not limited as described above when a vulcanizing agent is added in advance to a domain containing an electronic conductive material, and then the means for mixing the matrix-domain structure is used. Furthermore, when a domain containing an electronic conductive material is manufactured by kneading, means for controlling the temperature during kneading and the time of kneading, and forming carbon gel around the electronic conductive material may be adopted. In order to efficiently form the carbon gel, it is preferable that the temperature at the time of kneading is high and the time of kneading is long.

The matrix-domain structure of the present disclosure can also be manufactured using two types of rubber. Specifically, in the case of manufacturing the matrix-domain structure in the same manner as described above, a phase-separated structure can be effectively formed by adding a vulcanizing agent to the domain side in advance and thereafter mixing a rubber for domains and a rubber for matrices. For example, it is preferred that the rubber mixture for insulating domains (DRC-B) contains a vulcanizing agent.

Measurement Method for SP Value

The SP value can be accurately calculated by generating a calibration curve using a material of which SP value is already known. For this SP value, a catalog value of a material manufacturer may be used. For example, the SP values of NBR and SBR are virtually determined by the content ratios of acrylonitrile and styrene, without depending on the molecular weight.

Therefore the content ratio of acrylonitrile or styrene of the rubbers constituting the matrix and the domain are analyzed using such an analysis method as pyrolysis gas-chromatography (Py-GC) or solid-state NMR. Then the SP values can be calculated using the calibration curve obtained from a material of which SP value is known.

The SP value of isoprene rubber can be determined using an isomer structure, such as 1,2-polyisoprene, 1,3-polyisoprene, 3,4-polyisoprene, cis-1,4-polyisoprene and trans-1,4-polyisoprene. Hence just like the case of SBR and NBR, the isomer content ratio is analyzed using Py-GC, solid-state NMR or the like, and the SP value can be calculated based on a material of which SP value is known.

The SP value of the material of which SP value is known has been determined by the Hansen solubility sphere method.

(b) Ratio ($\eta m/\eta d$) Between Viscosity ($\eta d$) of DRC-A or DRC-B, and Viscosity ($\eta m$) of MRC The closer ($\eta d/\eta m$) of the ratio in viscosity between DRC-A or DRC-B and MRC (DRC-A/MRC or DRC-B/MRC) is to 1, the smaller the domain diameter can be. Specifically, the ratio in viscosity is preferably from 1.0 to 2.0. The ratio in viscosity can be adjusted by selecting the Mooney viscosity of raw material rubber used for DRC-A or DRC-B and MRC, and by selecting the type and blending amount of the filler.

It is also possible to add a plasticizer, such as paraffin oil, to the extent that it does not interfere with the formation of the phase-separated structure. The ratio in viscosity can be adjusted by adjusting the temperature during kneading.

The viscosity of the rubber mixture can be obtained by measuring the Mooney viscosity $ML_{(1+4)}$ at the rubber temperature during kneading on the basis of JIS K 6300-1: 2013.

The closer the ratio in viscosity (DRC-A/MRC or DRC-B/MRC) ($\eta d/\eta m$) between the domain and the matrix is to 1, the smaller the maximum Feret diameter of the domain can be. Specifically, by controlling the ratio in viscosity to 2.0 or less, preferred domain sizes can be obtained, which is thus preferable.

(c) Shear Rates ($\gamma$) During Kneading of DRC-a, DRC-B, and MRC and Energy Amount (EDK) During Shearing The higher the shear rates during kneading of DRC-A, DRC-B, and MRC, and the higher the amount of energy during shearing, the smaller the interdomain distance can be.

The shear rate can be increased by increasing the inner diameter of the stirring member, such as a blade or screw, of the kneader, reducing the gap from the end surface of the stirring member to the inner wall of the kneader, and increasing the rotation speed. In addition, the energy during shearing can be increased by increasing the rotation speed of the stirring member or by increasing the viscosity of the rubber.

The larger the shear rate at mixing and the amount of energy at shear, the smaller the maximum Feret diameter of the domain can be. The shear rate can be increased by increasing the inner diameter of the stirring member, such as a blade or screw, of the kneader, reducing the gap from the end surface of the stirring member to the inner wall of the kneader, and increasing the rotation speed.

(d) Volume Fraction of DRC-a or DRC-B Relative to MRC

The volume fraction of DRC-A or DRC-B relative to MRC correlates with the collision and coalescence probability between the rubber mixture for forming domains and the rubber mixture for forming matrices. Specifically, reducing the volume fraction of the rubber mixture for forming domains relative to the rubber mixture for forming matrices lowers the collision and coalescence probability between the rubber mixture for forming domains and the rubber mixture for forming matrices. That is, within the range where necessary conductivity can be obtained, the inter-domain distance can be reduced by reducing the volume fraction of the domain in the matrix.

Shape of Domains

The present inventors have found that the amount of electronic conductive agent contained in a single domain affects the external shape of the domain. That is, the present inventors have found that the external shape of the domain becomes closer to the sphere as the filled amount of the electronic conductive agent in a single domain increases. The more domains that are close to a sphere, the better because the uniformity of the distance between the conductive domain A and the insulating domain B increases.

According to the study by the present inventors, the reason is not clear, but a domain with a proportion of the total of the cross-sectional areas of the electronic conductive agent observed in the cross-section of one domain is 20% or more based on the area of the cross-section of the domain may take a shape closer to a sphere. As a result, an external shape that can significantly relax the concentration of electron transfer between domains can be formed and is thus preferable. Specifically, the proportion of the cross-sectional area of the electronic conductive agent included in the domain relative to the cross-sectional area of the domain is preferably 20% or more.

Regarding the shape without any unevenness on the peripheral surface of the domain, when the perimeter length of the domain A is taken as A, and the envelope perimeter length B of the domain A is taken as B, it is preferable to satisfy the following expression (5).

$$1.00 \leq A/B \leq 1.10 \quad (5)$$

(A: Perimeter length of the domain A, B: envelope perimeter length of the domain A)

Figure 5:
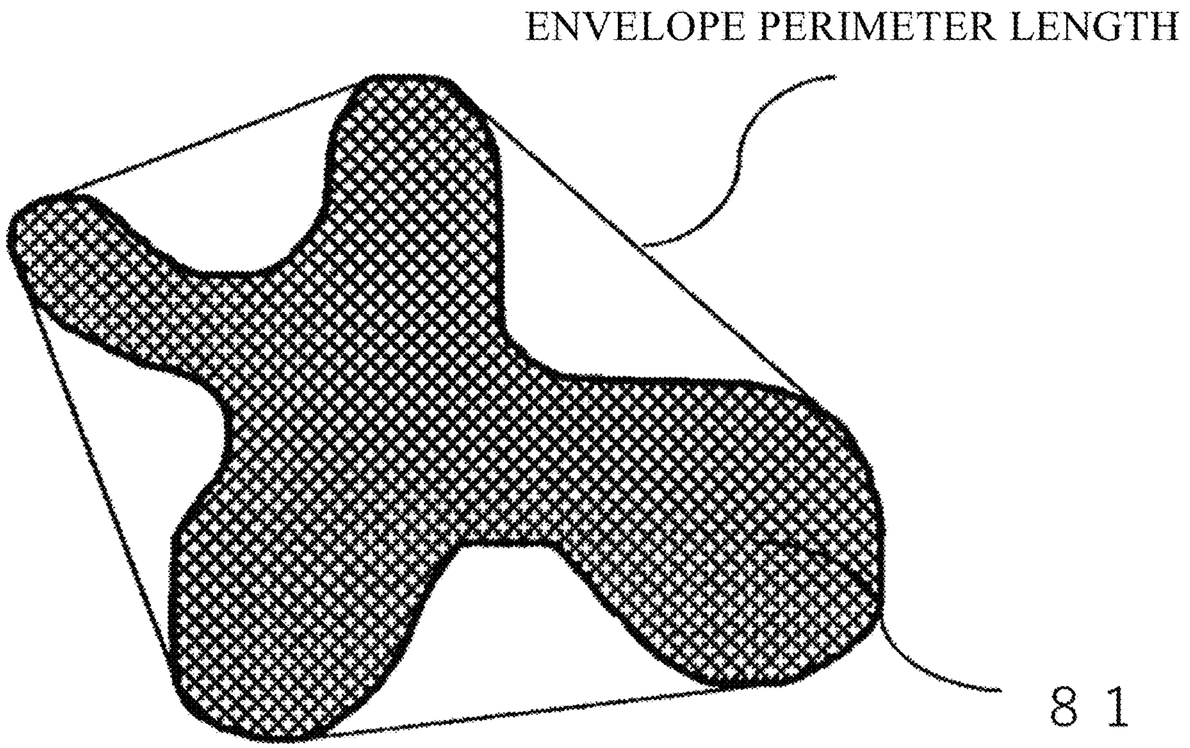
FIG. 5 is an explanatory view of an envelope perimeter length.

The expression (5) indicates a ratio of the perimeter length A of the domain A to the envelope perimeter length B of the domain A. Here, an envelope perimeter length is a perimeter length when the protruded portions of the domain 81 observed in the observation region are connected, as shown in FIG. 5.

The ratio of the perimeter length of the domain to the envelope perimeter length of the domain has a minimum of 1. The condition where the above ratio is 1 indicates that the domain has a circular or elliptical cross-sectional shape with no depressed portions. If the ratio exceeds 1.10, there will be a large uneven shape in the domain; that is, the electric field anisotropy appears. When A/B satisfies the expression (5), the concentration of an electric field can be reliably suppressed, and uniform discharging can be achieved.

A/B is preferably 1.00 to 1.07 and more preferably 1.00 to 1.05. A/B can be increased by increasing the viscosities of the matrix and domains. Also, A/B can be reduced by reducing the difference in viscosity between the matrix and the domains.

Method of Measuring Each Parameter Relating to Shape of Domains

First, a section is prepared in the same manner as the method for the measurement of the volume resistivity of the matrix described above. However, as described below, a section is prepared from the cross-section perpendicular to the longitudinal direction of the electrophotographic member, and the shape of the domain at the fracture surface of the section is evaluated. This reason will be described below.

FIGS. 2A and 2B are views illustrating the shape of the electrophotographic member 51 with three axes, specifically, as three-dimensional views with X-, Y-, and Z-axes. In FIGS. 2A and 2B, the X-axis indicates the direction parallel to the longitudinal direction (axial direction) of the electrophotographic member, and the Y- and the Z-axes indicate the directions perpendicular to the axial direction of the electrophotographic member. The thickness direction of the conductive layer is defined as the Z-axis.

FIG. 2A indicates an image when an electrophotographic member is cut out in a cross-section 52*a* parallel to the XZ plane 52 for an electrophotographic member. The XZ plane can rotate 3600 around the axis of the electrophotographic member. In consideration of a state where the electrophotographic member is brought into contact with the photosensitive drum and rotates to repeat contact with the photosensitive drum, a cross-section 52*a* parallel to the XZ plane 52 shows a surface simultaneously brought into contact with the photosensitive drum at a certain timing.

Therefore, for the evaluation of the shape of the domain correlating with the concentration of electric field in the electrophotographic member, it is necessary to evaluate the shape of the domain at a cross-section parallel to the YZ plane 53 perpendicular to the axial direction of the electrophotographic member, which allows the evaluation of the domain shape including a certain amount of cross-section 52*a*. In this evaluation, when the length of the conductive layer in the longitudinal direction is taken as L, a total of three points, that is, a cross-section 53*b* at the center in the longitudinal direction of the conductive layer and two cross-sections (53*a* and 53*c*) at the two points of the distance L/4 from both ends toward the center of the conductive layer, are selected (FIG. 2B).

Also, regarding the observation positions in the cross-sections 53*a* to 53*c*, when the thickness of the conductive layer is taken as T, the measurement should be performed at a total of 9 observation regions of 15 μm square placed at three positions (0.2 T, 0.5 T, and 0.7 T) in the thickness region from the outer surface to the depth of 0.1 T to 0.9 T of each section.

The fracture surface can be formed by freeze-cracking, cross-polisher, focused ion beam (FIB), or other means. In consideration of the smoothness of the fracture surface and pretreatment for observation, the FIB method is preferred. In order to suitably observe the matrix domain structure, pretreatment, such as staining treatment or vapor deposition treatment, which can suitably obtain contrast between the conductive phase and the insulating phase, may be performed.

The matrix-domain structure can be observed by a scanning electron microscope (SEM) and a transmission electron microscope (TEM) for the sections where the fracture surface has been formed and pre-treated. Among these, from the accuracy of quantification of the domain area, it is preferred to observe the matrix-domain structure at 1000× to 100000× magnification using an SEM.

The perimeter length and envelope perimeter length of the domain, and the number of domains can be measured by quantifying the captured image as above. On a fracture surface image obtained by observation with SEM, analysis regions of 15 μm square are extracted from each of the 9 images obtained at each observation position, and then 8-bit grayscaling is performed, thereby obtaining a 256-tone monochrome image using image processing such as Image-Pro Plus (manufactured by Media Cybernetics). Next, the black and white of the image can be inverted so that the domains in the fracture surface be white, and the image can be binarized to obtain a binarized image for analysis.

Method for Measuring Cross-Sectional Area Proportion r of Electronic Conductive Agent in Domains The cross-sectional area proportion of the electronic conductive agent in the domain can be measured by quantifying the binarized image described above. For the binarized image, the cross-sectional area S of domains and the total Sc of the cross-sectional areas of portions made of a conductive agent in each domain are calculated using the counting function in image processing software Image-Pro Plus (manufactured by Media Cybernetics). Then, the arithmetic mean value r (%) of Sc/S may be calculated.

For a cylindrical charging member, when the length of the conductive layer in the longitudinal direction is taken as L, and the thickness of the conductive layer is taken as T, cross-sections in the thickness direction of the conductive layer as illustrated in FIG. 2B are obtained, at three points, that is, the center in the longitudinal direction of the conductive layer and the positions of the distance L/4 from both ends toward the center of the conductive layer. For each of the obtained cross-sections, the above measurement should be performed in 15-μm square regions at three points (0.2 T, 0.5 T, and 0.7 T) in the thickness region from the outer surface of the conductive layer to the depth of 0.1 T to 0.9 T in the support member direction, and the cross-sectional area proportion should be calculated from the arithmetic mean of the measured values from the total 9 regions.

Method of Measuring Perimeter Length a and Envelope Perimeter Length B of Domains The perimeter length and envelope perimeter length of the domain, and the number of the domains can be measured by quantifying the binarized image described above. For the binarized image, the perimeter length A and the envelope perimeter length B of each domain in the domain size group in the image should be calculated using the counting function in image processing software Image-Pro Plus (manufactured by Media Cybernetics), and the arithmetic mean of the perimeter length ratio A/B of the domain should be calculated.

For a cylindrical charging member, when the length of the conductive layer in the longitudinal direction is taken as L, and the thickness of the conductive layer is taken as T, cross-sections in the thickness direction of the conductive layer as illustrated in FIG. 2B are obtained, at three points, that is, the center in the longitudinal direction of the conductive layer and the positions of the distance L/4 from both ends toward the center of the conductive layer. For each of the obtained cross-sections, the above measurement should be performed in 15-μm square regions at three points (0.2 T, 0.5 T, and 0.7 T) in the thickness region from the outer surface of the conductive layer to the depth of 0.1 T to 0.9 T in the support member direction, and the cross-sectional area proportion should be calculated from the arithmetic mean of the measured values from the total 9 regions.

Method of Measuring Shape Index of Domains

The shape index of the domain should be calculated by calculating the number percent of the domain group with a μr (%) of 20% or more and a perimeter length ratio A/B of domains satisfying the above expression (5) with respect to the total number of domains. That is, the shape index of the domain should be calculated by calculating the number of domains in the binary image of the domain group in the above binary image using the counting function of the image processing software Image-Pro Plus (manufactured by Media Cybernetics) and further calculating the number percent of domains that satisfy μr≥20 and the above expression (5).

For a cylindrical charging member, when the length of the conductive layer in the longitudinal direction is taken as L, and the thickness of the conductive layer is taken as T, a cross-section in the thickness direction of the conductive layer as illustrated in FIG. 2B are obtained, at three points, that is, the center in the longitudinal direction of the conductive layer and the positions of the distance L/4 from both ends toward the center of the conductive layer. For each of the obtained cross-sections, the above measurement should be performed in 15-μm square regions at three points (0.2 T, 0.5 T, and 0.7 T) in the thickness region from the outer surface of the conductive layer to the depth of 0.1 T to 0.9 T in the support member direction, and the cross-sectional area proportion should be calculated from the arithmetic mean of the measured values from the total 9 regions.

Amount of Electronic Conductive Agent Added in Domain A The amount of the electronic conductive agent blended in the shell in the domain is preferably an amount such that the ratio of the cross-sectional area of the electronic conductive agent to the cross-sectional area of the domain is at least 20% or more, preferably from 25% to 30%. When the amount is within the above range, the domain can be filled with an electronic conductive agent at a high density. Then, the outer shape of the domain can be brought close to the sphere, and the unevenness can be reduced. Furthermore, since the addition of the electronic conductive agent improves the reinforcing property of the shell portion and increases the elastic modulus, the strain of the shell portion can be reduced.

In order to obtain domains filled with an electronic conductive agent at a high density as described above, carbon black having a DBP absorption of 40 to 80 $cm^3$/100 g may be particularly preferably used as the electronic conductive agent. The DBP absorption ($cm^3$/100 g) means a volume of dibutyl phthalate (DBP) that can be adsorbed by 100 g of carbon black and is measured in accordance with Japanese Industrial Standard (JIS) K 6217-4:2017 (Carbon black for rubber industry—Fundamental characteristics—Part 4: Determination of oil absorption number (OAN) and oil absorption number of compressed sample (COAN)).

In general, carbon black has a tufted higher-order structure in which primary particles having an average particle size of from 10 to 50 nm aggregate. This tufted higher-order structure is called a "structure", and the degree thereof is quantified with the DBP absorption ($cm^3$/100 g). Since the conductive carbon black having a DBP absorption within the above range has an undeveloped structure, carbon black aggregation is low, and dispersibility in rubber is good. Therefore, the filling amount into the domain can be increased, and, as a result, it is easier to obtain the outer shape of the domain that is closer to a sphere. Furthermore, conductive carbon black having a DBP absorption within the above range is effective because it is difficult to form aggregates.

The electronic conductive agent is, for example, a conductive particle. Among the conductive particles, a conductive particle containing conductive carbon black as a main component is preferred for the reasons of high conductivity efficiency, high affinity with rubber, easy control of the distance between the conductive particles, and the like.

The type of conductive carbon black formulated in the domains is not particularly limited. Specific examples may include gas furnace black, oil furnace black, thermal black, lamp black, acetylene black, Ketjenblack, and the like. Among them, carbon black having a DBP absorption of 40 to 80 $cm^3$/100 g may be particularly suitably used, as will be described later.

By adding a large amount of carbon black to the shell in the domain, the shape of the domain is likely to approach the sphere shape. The reason is presumed that the amount of carbon gel can be increased as follows. The carbon gel is a particulate material that has been brought into a pseudo-crosslinked state by the adsorption of rubber molecules to carbon black. Carbon gel does not dissolve even in an organic solvent that dissolves the raw material rubber. That is, it is considered that carbon gel is three-dimensionally crosslinked by physical adsorption or chemical adsorption of rubber molecules to the surface of carbon black and acts as rubber particles. As a result, it is presumed that rubber particles formed from carbon gel become nuclei and form domains. In order to increase the carbon gel, it is preferable to blend a large amount of carbon black with respect to the rubber, and the carbon black that functions as an adsorbent should be increased.

Reinforcing Material

It is also possible to blend reinforcing carbon black as a reinforcing agent for the purpose of improving the ratio of the elastic modulus of the domain. Examples of reinforcing carbon blacks used here may include low-conductivity carbon blacks, such as FEF, GPF, SRF, and MT carbon.

Also, if necessary, a filler, a processing aid, a vulcanization aid, a vulcanization accelerator, a vulcanization acceleration aid, a vulcanization retarder, an anti-aging agent, a softening agent, a dispersing agent, a colorant, and the like that are normally used as the compounding agent for rubber may be added.

Process Cartridge

Figure 6:
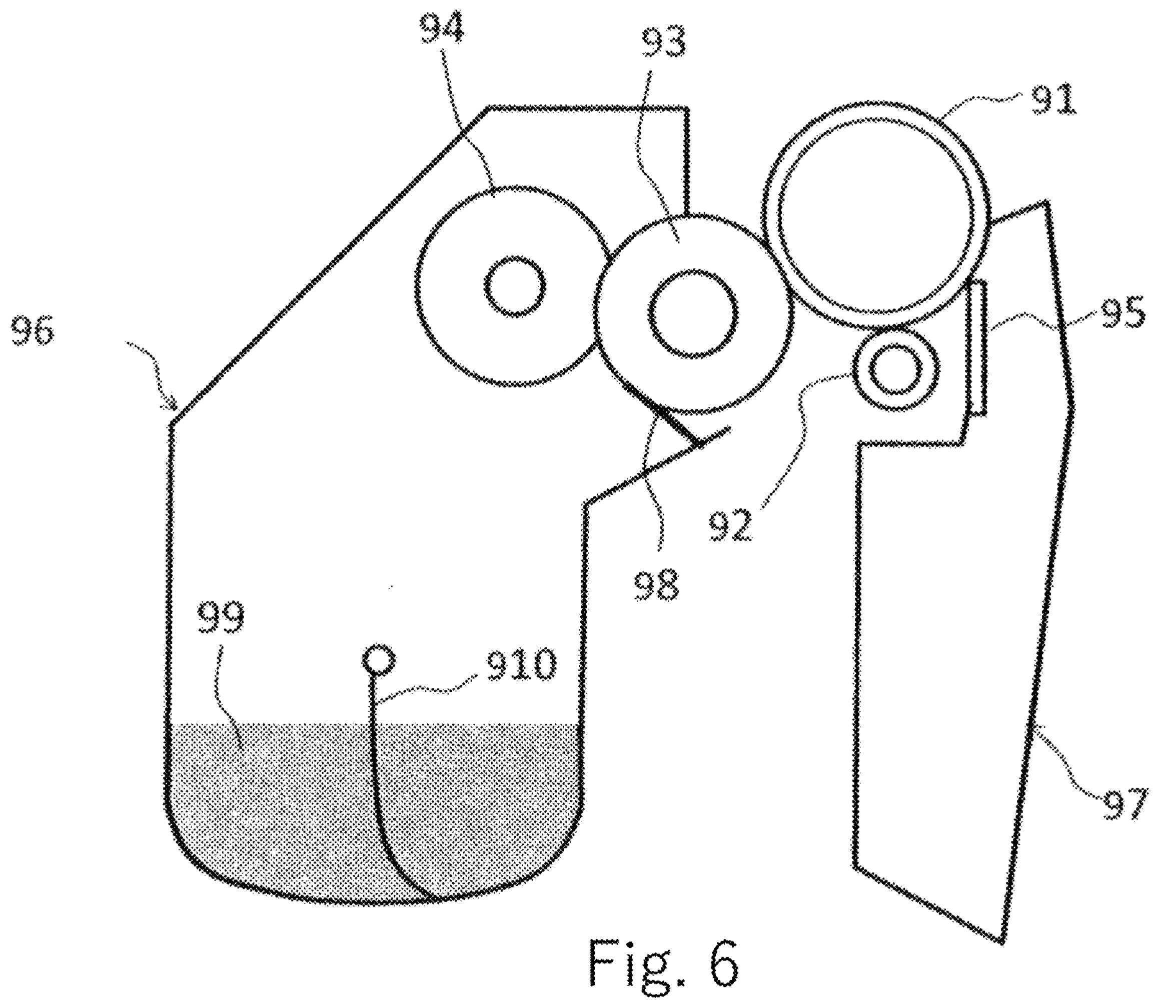
FIG. 6 is a schematic view of a process cartridge.

At least one aspect of the present disclosure provides a process cartridge including an electrophotographic member of the present disclosure. FIG. 6 is a schematic cross-sectional view of a process cartridge for electrophotography including an electrophotographic member according to one embodiment of the present disclosure as a charging member (charging roller). This process cartridge is formed by integrating a developing apparatus and a charging apparatus and is configured attachable and detachable to the main body of the electrophotographic apparatus.

The developing apparatus includes at least a developing roller 93, a toner container 96, and a toner 99 that are integrated and, if necessary, may include a toner supply roller 94, a developing blade 98, and a stirring blade 910.

The charging apparatus includes at least a photosensitive drum 91 and a charging roller 92 that are integrated and may include a cleaning blade 95 and a waste toner container 97. A voltage is applied to the charging roller 92, the developing roller 93, the toner supply roller 94, and the developing blade 98, respectively.

Also, the electrophotographic member according to the present disclosure can be used as a charging roller, a developing roller, a developing blade, and a toner supply roller. The electrophotographic member is preferably a charging member, and the electrophotographic member is more preferably a charging roller.

Electrophotographic Image Forming Apparatus

Figure 7:
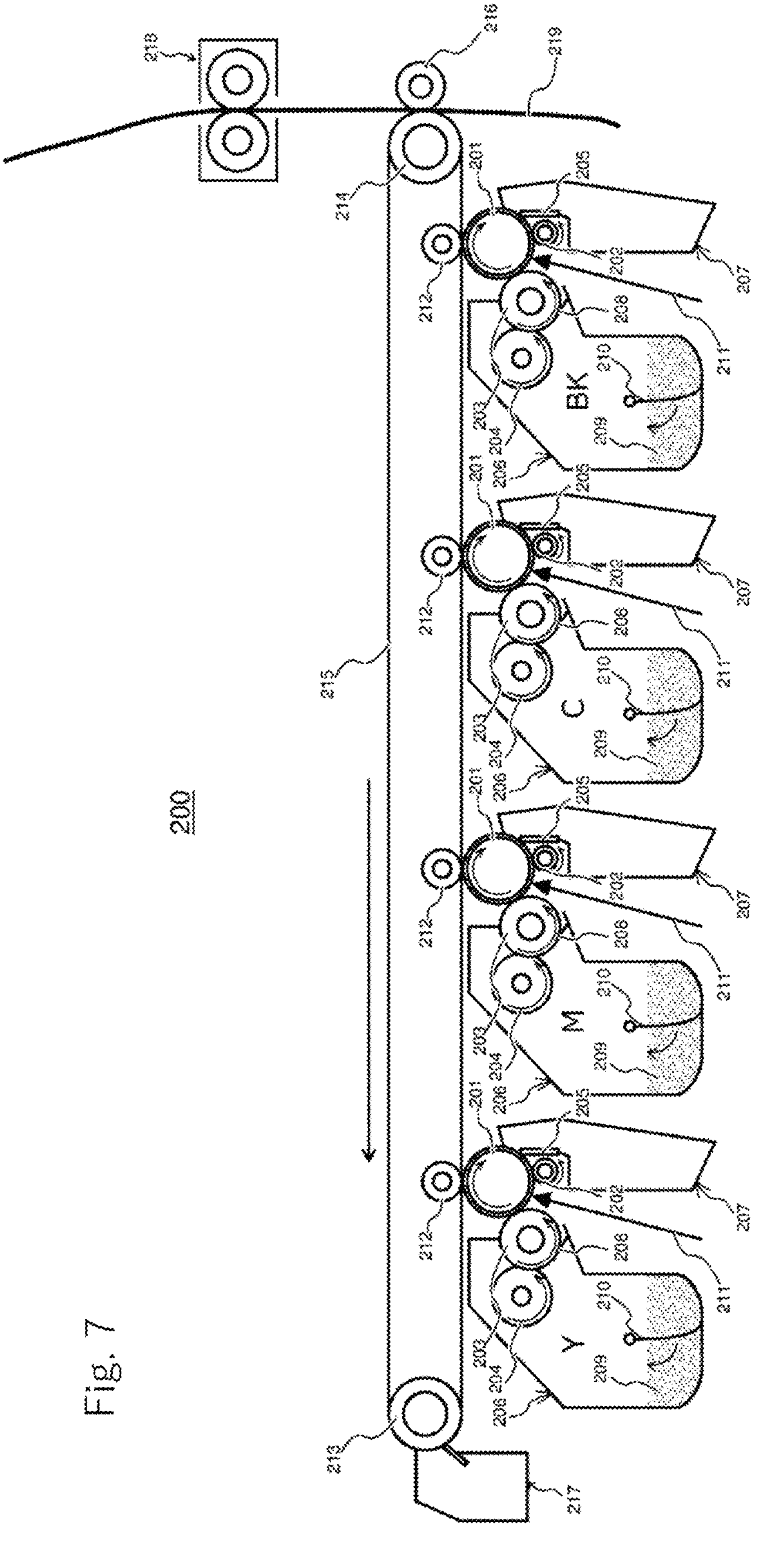
FIG. 7 is a diagram showing a schematic configuration of an electrophotographic image forming apparatus.

At least one aspect of the present disclosure provides an electrophotographic image forming apparatus including the electrophotographic member of the present disclosure. FIG. 7 is a schematic structural view of an electrophotographic image forming apparatus 200 using an electrophotographic member according to one embodiment of the present disclosure as a charging member (charging roller). This apparatus is a color electrophotographic apparatus to which the process cartridge is detachably mounted. For each process cartridge, black BK, magenta M, yellow Y, and cyan C toners are used.

The photosensitive drum 201 rotates in the direction of the arrow, is uniformly charged by the charging roller 202 to which a voltage has been applied from a charging bias power source, and an electrostatic latent image is formed on the surface of the photosensitive drum 201 by the exposure light 211. Meanwhile, the toner 209 accommodated in the toner container 206 is supplied to the toner supply roller 204 by the stirring blade 210, and is transported onto the developing roller 203. The developing blade 208 disposed in contact with the developing roller 203 uniformly coats the surface of the developing roller 203 with the toner 209, and charges are given to the toner 209 due to triboelectric charging. The electrostatic latent image is developed by the toner 209 conveyed by the developing roller 203 arranged in contact with the photosensitive drum 201 and attached to the electrostatic latent image, and is visualized as a toner image.

The visualized toner image on the photosensitive drum is transferred to an intermediate transfer belt 215 supported and driven by a tension roller 213 and an intermediate transfer belt driver roller 214 by a primary transfer roller 212 to which a voltage has been applied by a primary transfer bias power source. The respective color toner images are sequentially overlapped to form a color image on the intermediate transfer belt.

The transfer material 219 is fed into the apparatus by a paper feeding roller and is transported between the intermediate transfer belt 215 and the secondary transfer roller 216. A voltage is applied to the secondary transfer roller 216 from a secondary transfer bias power source to transfer the color image on the intermediate transfer belt 215 to the transfer material 219. The transfer material 219 to which the color image has been transferred is subjected to a fixing process by a fixing unit 218, and is discharged to the outside of the apparatus, and the printing operation is completed.

Meanwhile, the toner remaining on the photosensitive drum without being transferred is scraped off by the cleaning blade 205 and stored in the waste toner container 207, and the cleaned photosensitive drum 201 repeats the above steps. Also, the toner remaining on the primary transfer belt without being transferred is also scraped off by the cleaning apparatus 217.

Although a color electrophotographic apparatus has been described as an example, the process cartridge in a monochrome electrophotographic apparatus (not illustrated) is only a product using a black toner. The monochrome image is formed directly onto the transfer material by the process cartridge and the primary transfer roller (without secondary transfer roller) without the intermediate transfer belt. After that, the image is fixed by the fixing unit, and the transfer material is ejected to the outside of the apparatus, thereby completing the printing operation.

EXAMPLES

The present disclosure will be described below with reference to the examples, but the technical scope of the present disclosure is not limited thereto.

The electrophotographic members in Examples and Comparative Examples were made using the materials shown below:

NBR

NBR (Product name: JSR NBR N230SV, acrylonitrile content: 35%, Mooney viscosity ML(1+4) 100° C.: 32, SP value: 20.0 $(J/cm^3)^{0.5}$, manufactured by JSR Corporation, abbreviated name: N230SV)

Isoprene Rubber IR

Isoprene rubber (Product name: Nipol IR2200L, Mooney viscosity ML(1+4) 100° C.: 70, SP value: 16.5 $(J/cm^3)^{0.5}$, manufactured by Zeon Corporation, abbreviated name: IR 2200L)

Butadiene Rubber BR

Butadiene rubber (Product name: UBEPOL BR150B, Mooney viscosity ML(1+4) 100° C.: 40, SP value: 16.8 $(J/cm^3)^{0.5}$, manufactured by Ube Industries, Ltd., abbreviated name: BR150B)

SBR

SBR (Product name: TUFDENE 2003, styrene content: 25%, Mooney viscosity ML(1+4) 100° C.: 33, SP value: 17.0 $(J/cm^3)^{0.5}$, manufactured by Asahi Kasei Corporation, abbreviated name: T2003)

Chloroprene Rubber (CR)

Chloroprene rubber (Product name: SKYPRENE B31, Mooney viscosity ML(1+4) 100° C.: 40, SP value: 17.4 $(J/cm^3)^{0.5}$, manufactured by Tosoh Corporation, abbreviated name: B31)

EPDM

EPDM (Product name: Esprene 505A, Mooney viscosity ML(1+4) 100° C.: 47, SP value: 16.0 $(J/cm^3)^{0.5}$, manufactured by Sumitomo Chemical Company, Ltd., abbreviated name: E505A)

Butyl Rubber

Butyl (Product name: Butyl 065, Mooney viscosity ML(1+4) 100° C.: 32, SP value: 15.8 $(J/cm^3)^{0.5}$, manufactured by JSR Corporation, abbreviated name: Butyl 065)

Electronic Conductive Agent (Conductive Particle)

Carbon black (2) (Product name: TOKABLACK #7360SB, DBP absorption: 87 $cm^3$/100 g, manufactured by Tokai Carbon Co., Ltd., abbreviated name: #7360)

Carbon black (3) (Product name: TOKABLACK #7270SB, DBP absorption: 62 $cm^3$/100 g, manufactured by Tokai Carbon Co., Ltd., abbreviated name: #7270)

Conductive Tin Oxide (Product name: S-2000, DBP absorption: 80 $cm^3$/100 g, manufactured by Mitsubishi Materials Electronic Chemicals Co., Ltd., abbreviated name: tin oxide)

Vulcanizing Agent

Vulcanizing agent (1) (Product name: SULFAX PMC, sulfur content: 97.5%, manufactured by Tsurumi Chemical Industry Co., Ltd., abbreviated name: sulfur)

Vulcanization Accelerator

Vulcanization accelerator (1) (Product name: SANCELER TBZTD, tetrabenzylthiuram disulfide, manufactured by Sanshin Chemical Industry Co., Ltd., abbreviated name: TBZTD)

Filler

Filler (1) (Product name: NANOX #30, calcium carbonate, manufactured by Maruo Calcium Co., Ltd., abbreviated name: #30)

Example 1

1. Preparation of Unvulcanized Rubber Composition for Forming Conductive Layer Used for Forming Conductive Layer 1-1. Preparation of Carbon Master Batch (Rubber Mixture DRC-a for Conductive Domain) in Domains The materials, the types and blending amounts of which are shown in Table 1, were mixed with a 6-liter pressure kneader (product name: TD6-15MDX, manufactured by TOSIN Co., Ltd.) to obtain a rubber mixture for conductive domains. The mixing conditions were set at a filling rate of 70 vol %, a blade rotation speed of 30 rpm, and a mixing time of 16 minutes. The rubber release temperature was 160° C.

TABLE 1

| | Name of raw material | Blending amount |
|---|---|---|
| Raw material rubber | EPDM (Product name: Esprene 505A, manufactured by Sumitomo Chemical Company, Ltd.) | 100 |
| Electronic conductive agent | Carbon black (Product name: TOKABLACK #7360, manufactured by Tokai Carbon Co., Ltd.) | 70 |
| Vulcanization acceleration aid | Zinc oxide (Product name: Zinc Oxide, manufactured by Sakai Chemical Industry Co., Ltd.) | 5 |
| Processing aid | Zinc stearate (Product name SZ-2000, manufactured by Sakai Chemical Industry Co., Ltd.) | 2 |

1-2. Preparation of Rubber Mixture (DRC-B) for Insulating Domains

The materials, the types and blending amounts of which are shown in Table 2, were mixed with a 6-liter pressure kneader (product name: TD6-15MDX, manufactured by TOSIN Co., Ltd.) to obtain a rubber mixture for insulating domains. The mixing conditions were set at a filling rate of 70 vol %, a blade rotation speed of 30 rpm, and a mixing time of 16 minutes.

TABLE 2

| | Name of raw material | Blending amount |
|---|---|---|
| Raw material rubber | EPDM (Product name: Esprene 505A, manufactured by Sumitomo Chemical Company, Ltd.) | 100 |
| Vulcanization acceleration aid | Zinc oxide (Product name: Zinc Oxide, manufactured by Sakai Chemical Industry Co., Ltd.) | 5 |
| Processing aid | Zinc stearate (Product name SZ-2000, manufactured by Sakai Chemical Industry Co., Ltd.) | 2 |
| Vulcanizing agent | Sulfur (SULFAX PMC, manufactured by Tsurumi Chemical Industry Co., Ltd.) | 1 |

1-3. Preparation of Rubber Mixture (MRC) for Forming Matrix

The materials, the types and blending amounts of which are shown in Table 3, were mixed with a 6-liter pressure kneader (product name: TD6-15MDX, manufactured by TOSIN Co., Ltd.) to obtain a rubber mixture for forming matrices. The mixing conditions were set at a filling rate of 70 vol %, a blade rotation speed of 30 rpm, and a mixing time of 16 minutes.

TABLE 3

| | Name of raw material | Blending amount |
|---|---|---|
| Raw material rubber | NBR (Product name: N230SV, manufactured by JSR Corporation) | 100 |
| Filler | Calcium carbonate (Product name: NANOX#30, manufactured by Maruo Calcium Co., Ltd.) | 45 |
| Processing aid | Zinc oxide (Product name: Zinc Oxide, manufactured by Sakai Chemical Industry Co., Ltd.) | 5 |
| Processing aid | Zinc stearate (Product name SZ-2000, manufactured by Sakai Chemical Industry Co., Ltd.) | 2 |

1-4. Preparation of Rubber Mixture (M-DRC) for Forming Matrices and Insulation Domains The materials shown in Table 4 were mixed with a 6-liter pressure kneader (product name: TD6-15MDX, manufactured by TOSIN Co., Ltd.) to obtain a rubber mixture (M-DRC) for forming matrices and insulating domains. The mixing conditions were set at a filling volume of 70 vol %, a blade rotation speed of 30 rpm, and a mixing time of 16 minutes.

TABLE 4

| | Name of raw material | Blending amount |
|---|---|---|
| Raw material rubber | Rubber mixture for matrices (MRC) | 70 |
| Filler | Rubber mixture for forming insulating domains (DRC-B) | 30 |
| Filler | Calcium carbonate (Product name: NANOX#30, manufactured by Maruo Calcium Co., Ltd.) | 60 |
| Processing aid | Zinc oxide (Product name: Zinc Oxide, manufactured by Sakai Chemical Industry Co., Ltd.) | 5 |
| | Zinc stearate (SZ-2000, manufactured by Sakai Chemical Industry Co., Ltd.) | 2 |

1-5. Preparation of Rubber Mixture for Forming Conductive Layers

The materials shown in Table 5 were mixed in a 6-liter pressure kneader (product name: TD6-15MDX, manufactured by TOSIN Co., Ltd.) to obtain a rubber mixture for forming conductive layers. The mixing conditions were set at a filling volume of 70 vol %, a blade rotation speed of 30 rpm, and a mixing time of 16 minutes.

TABLE 5

| | Name of raw material | Blending amount |
|---|---|---|
| Raw material rubber | Rubber mixture for forming conductive domains (DRC-A) | 23 |
| Raw material rubber | Rubber mixture for forming matrices and insulating domains (M-DRC) | 77 |

1-6. Preparation of Unvulcanized Rubber Composition for Forming Conductive Layer The materials of the types and blending amounts shown in Table 6 were mixed with open rolls to obtain an unvulcanized rubber composition for forming conductive layers. An open roll with a roll diameter of 12 inches was used as a mixer. The mixing conditions were as follows: the materials were kneaded leftward and rightward a total of 20 times at a front roll rotation speed of 10 rpm, a back roll rotation speed of 8 rpm, and a roll gap of 2 mm, and then tight milling was performed 10 times at a roll gap of 1.0 mm.

TABLE 6

| | Name of raw material | Blending amount |
|---|---|---|
| Raw material rubber | Rubber mixture for forming conductive layers | 100 |
| Vulcanizing agent | Sulfur (SULFAX PMC, manufactured by Tsurumi Chemical Industry Co., Ltd.) | 3 |
| Vulcanization accelerator 1 | Tetrabenzylthiuram disulfide (Product name: TBzTD, manufactured by Ouchi Shinko Chemical Industrial Co., Ltd.) | 3 |

2. Preparation of Electrophotographic Member 2-1. Formation of Conductive Layer

As a support member, a core metal of 252 mm in total length and 6 mm in outer diameter with electroless nickel plating on the surface of free-cutting steel was prepared. This core metal was used as a support member that was a conductive shaft core. Using a roll coater, an adhesive (product name: METALOC U-20, manufactured by Toyokagaku Kenkyusyho Co., Ltd.) was applied over the entire circumference of the range of 230 mm except for portions within 11 mm from both ends of the core metal. In this example, a core metal coated with the adhesive was used as the conductive support member.

Next, a die having an inner diameter of 10.0 mm was attached to the tip of a crosshead extruder having a supply mechanism of a conductive support member and a discharge mechanism of an unvulcanized rubber roller, and the temperatures of the extruder and the crosshead were adjusted to 100° C., and the conveying speed of the conductive support member was adjusted to 60 mm/sec. Under this condition, an unvulcanized rubber composition for forming conductive layers was supplied from the extruder to cover the outer periphery of the conductive support member with the unvulcanized rubber composition for forming conductive layers in the crosshead, thereby obtaining an unvulcanized rubber roller.

Next, the unvulcanized rubber roller was put into a hot air current vulcanization furnace at 170° C. and heated for 60 minutes to vulcanize the unvulcanized rubber composition, thereby obtaining a conductive roller having a conductive layer formed on the outer periphery of the conductive support member. After that, both ends of the conductive layer were cut by 10 mm each so that the length of the conductive layer in the longitudinal direction was 232 mm.

2-2. Polishing Conductive Layer

Next, the surface of the conductive layer was polished under the polishing conditions described in the following polishing condition 1 to obtain a crown-shaped charging roller 1 having a diameter at the center part of 8.5 mm and a diameter at positions of 90 mm from the central portion toward both end sides of 8.44 mm.

Polishing Condition 1

A cylindrical whetstone of 305 mm in diameter and 235 mm in length (manufactured by TEIKEN Co., Ltd.) was prepared. The type of abrasive grain, the grain size, the binding degree, the linker, and the texture (percentage of grain) are as follows:

Material of abrasive grain: GC (green silicon carbide), (JIS R 6111-2002)

Grain size of abrasive grain: #80 (average particle size: 177 μm, JIS B 4130)

Binding degree of abrasive grains: HH (JIS R 6210)

Linker: V4PO (vitrified)

Texture of abrasive grain (percentage of grain): 23 (abrasive grain content: 16%, JIS R 6242)

The polishing conditions were as follows: the rotation speed of the whetstone was set to 2100 rpm, the rotation speed of the electrophotographic member was set to 250 rpm, and in the roughing step, the penetration speed of the whetstone into the electrophotographic member was set to 20 mm/sec, and the whetstone was allowed to penetrate by 0.24 mm after the contact with the outer surface of the electrophotographic member. In the precision polishing step, the penetration speed was changed to 0.5 mm/sec, and abrasive grains were allowed to penetrate by 0.01 mm. After that, the whetstone was removed from the electrophotographic member to complete the polishing. As the polishing method, an uppercut method, in which the rotating directions of the whetstone and the electrophotographic member were in the same direction, was employed.

Examples 2 to 23 and Comparative Examples 1 and 2 Electrophotographic members (charging rollers of Examples 2 to 23 and Comparative Examples 1 and 2) were prepared in the same manner as Example 1, except that the rubber, filler, conductive particle, and sulfur in the formulation of the rubber composition, and the formulations of rubber mixtures for forming conductive layers were as listed in Table 7.

Comparative Example 3

An electrophotographic member was prepared in the same manner as Example 6, except that the mixing condition during mixing the rubber for forming conductive layers was changed such that the blade rotation speed was set to 35 rpm, the mixing time was set to 20 minutes, and the amount of calcium carbonate during mixing the matrix was set to 65 parts.

Comparative Example 4

An electrophotographic member was prepared in the same manner as Example 21, except that the mixing condition of the rubber mixture (M-DRC) for forming matrices and insulating domains was changed such that the blade rotation speed was set to 35 rpm, and the mixing time was set to 25 minutes.

Comparative Example 5

An electrophotographic member was prepared in the same manner as Example 5, except that the mixing condition for preparing a matrix was changed such that the blade rotation speed was set to 35 rpm, the mixing time was set to 25 minutes, and the amount of calcium carbonate during mixing the matrix was set to 70 parts.

Comparative Example 6

An electrophotographic member was prepared in the same manner as Example 22, except that the mixing condition of the rubber mixture (DRC-B) for insulating domains was changed such that the blade rotation speed was set to 25 rpm, and the mixing time was set to 12 minutes.

TABLE 7

| | Rubber mixture for forming matrices (MRC) | | | | | | | Rubber mixture for forming domains DRC-A domain A | | | | | |
|---|---|---|---|---|---|---|---|---|---|---|---|---|---|
| | First rubber | | | | | Filler | | Second rubber | | | | | Conductive particle |
| Examples | Rubber type | Abbreviation | M | SP | Parts | Abbreviation | Parts | Rubber type | Abbreviation | M | SP | Parts | Abbreviation |
| 1 | NBR | N230SV | 32 | 20.0 | 100 | #30 | 45 | EPDM | E505A | 47 | 16.0 | 100 | #7360SB |
| 2 | NBR | N230SV | 32 | 20.0 | 100 | #30 | 45 | SBR | T2003 | 33 | 17.0 | 100 | #7360SB |
| 3 | NBR | N230SV | 32 | 20.0 | 100 | #30 | 45 | SBR | T2003 | 33 | 17.0 | 100 | #7360SB |
| 4 | NBR | N230SV | 32 | 20.0 | 100 | #30 | 45 | IR | IR2200L | 70 | 16.5 | 100 | #7360SB |
| 5 | CR | B31 | 40 | 17.4 | 80 | #30 | 45 | EPDM | E505A | 47 | 16.0 | 100 | #7360SB |
| 6 | NBR | N230SV | 32 | 20.0 | 100 | #30 | 45 | EPDM | E505A | 47 | 16.0 | 100 | Tin oxide |
| 7 | NBR | N230SV | 32 | 20.0 | 100 | #30 | 45 | EPDM | E505A | 47 | 16.0 | 100 | #7360SB |
| 8 | NBR | N230SV | 32 | 20.0 | 100 | #30 | 45 | EPDM | E505A | 47 | 16.0 | 100 | #7360SB |
| 9 | NBR | N230SV | 32 | 20.0 | 100 | #30 | 45 | EPDM | E505A | 47 | 16.0 | 100 | #7360SB |
| 10 | NBR | N230SV | 32 | 20.0 | 100 | #30 | 45 | EPDM | E505A | 47 | 16.0 | 100 | #7360SB |
| 11 | NBR | N230SV | 32 | 20.0 | 100 | #30 | 45 | EPDM | E505A | 47 | 16.0 | 100 | #7360SB |
| 12 | NBR | N230SV | 32 | 20.0 | 100 | #30 | 45 | EPDM | E505A | 47 | 16.0 | 100 | #7360SB |
| 13 | NBR | N230SV | 32 | 20.0 | 100 | #30 | 45 | SBR | T2003 | 33 | 17.0 | 100 | #7360SB |
| 14 | NBR | N230SV | 32 | 20.0 | 100 | #30 | 45 | SBR | T2003 | 33 | 17.0 | 100 | #7360SB |
| 15 | NBR | N230SV | 32 | 20.0 | 100 | #30 | 45 | SBR | T2003 | 33 | 17.0 | 100 | #7360SB |
| 16 | NBR | N230SV | 32 | 20.0 | 100 | #30 | 45 | IR | IR2200L | 70 | 16.5 | 100 | #7360SB |
| 17 | NBR | N230SV | 32 | 20.0 | 100 | #30 | 45 | IR | IR2200L | 70 | 16.5 | 100 | #7360SB |
| 18 | NBR | N230SV | 32 | 20.0 | 100 | #30 | 45 | BR | BR150B | 40 | 16.8 | 100 | #7360SB |
| 19 | NBR | N230SV | 32 | 20.0 | 100 | #30 | 45 | BR | BR150B | 40 | 16.8 | 100 | #7360SB |
| 20 | NBR | N230SV | 32 | 20.0 | 100 | #30 | 45 | BR | BR150B | 40 | 16.8 | 100 | #7360SB |
| 21 | NBR | N230SV | 32 | 20.0 | 100 | #30 | 45 | EPDM | E505A | 47 | 16.0 | 100 | #7360SB |
| 22 | NBR | N230SV | 32 | 20.0 | 100 | #30 | 45 | Butyl | Butyl065 | 32 | 15.8 | 100 | #7270SB |
| 23 | NBR | N230SV | 32 | 20.0 | 100 | #30 | 45 | EPDM | E505A | 47 | 16.0 | 100 | #7360SB |
| Comparative 1 | SBR | T2003 | 33 | 17.0 | 100 | #30 | 40 | NBR | N230SV | 32 | 20.0 | 100 | #7360SB |
| Comparative 2 | NBR | N230SV | 32 | 20.0 | 100 | #30 | 40 | SBR | T2003 | 33 | 17.0 | 100 | #7360SB |
| Comparative 3 | NBR | N230SV | 32 | 20.0 | 100 | #30 | 65 | EPDM | E505A | 47 | 16.0 | 100 | Tin oxide |
| Comparative 4 | NBR | N230SV | 32 | 20.0 | 100 | #30 | 45 | EPDM | E505A | 47 | 16.0 | 100 | #7360SB |
| Comparative 5 | CR | B31 | 40 | 17.4 | 80 | #30 | 70 | EPDM | E505A | 47 | 16.0 | 100 | #7360SB |
| Comparative 6 | NBR | N230SV | 32 | 20.0 | 100 | #30 | 45 | Butyl | Butyl065 | 32 | 15.8 | 100 | #7270SB |

| | Rubber mixture for forming domains DRC-A domain A | | Rubber mixture for forming domains DRC-B domain B | | | | | | Ratio | | |
|---|---|---|---|---|---|---|---|---|---|---|---|
| | Conductive particle | | Third rubber | | | | | | | DRC-A | DRC-B |
| Examples | Parts | A °C. | Rubber type | Abbreviation | M | SP | Parts | Sulfur Parts | MRC Parts | Parts | Parts |
| 1 | 70 | 160 | EPDM | E505A | 47 | 16.0 | 100 | 1 | 54 | 23 | 23 |
| 2 | 50 | 140 | EPDM | E505A | 47 | 16.0 | 100 | 0 | 60 | 31 | 9 |

TABLE 7-continued

| | | | | | | | | | | | |
|---|---|---|---|---|---|---|---|---|---|---|---|
| 3 | 35 | 135 | EPDM | E505A | 47 | 16.0 | 100 | 0 | 49 | 40 | 11 |
| 4 | 70 | 150 | EPDM | E505A | 47 | 16.0 | 100 | 0 | 54 | 23 | 23 |
| 5 | 70 | 160 | SBR | T2003 | 33 | 17.0 | 100 | 1 | 54 | 23 | 23 |
| 6 | 70 | 150 | SBR | T2003 | 33 | 17.0 | 100 | 1 | 54 | 23 | 23 |
| 7 | 75 | 165 | EPDM | E505A | 47 | 16.0 | 100 | 1 | 54 | 21 | 25 |
| 8 | 80 | 175 | EPDM | E505A | 47 | 16.0 | 100 | 1 | 54 | 19 | 27 |
| 9 | 70 | 160 | BR | BR150B | 40 | 16.8 | 100 | 1 | 54 | 23 | 23 |
| 10 | 70 | 160 | EPDM | E505A | 47 | 16.0 | 100 | 1 | 54 | 23 | 23 |
| 11 | 70 | 160 | SBR | T2003 | 33 | 17.0 | 100 | 1 | 54 | 23 | 23 |
| 12 | 60 | 151 | IR | IR2200L | 70 | 16.5 | 100 | 1 | 54 | 25 | 21 |
| 13 | 70 | 155 | EPDM | E505A | 47 | 16.0 | 100 | 0 | 54 | 23 | 23 |
| 14 | 67 | 150 | SBR | T2003 | 33 | 17.0 | 100 | 1 | 54 | 24 | 22 |
| 15 | 70 | 155 | IR | IR2200L | 70 | 16.5 | 100 | 0 | 54 | 23 | 23 |
| 16 | 70 | 150 | SBR | T2003 | 33 | 17.0 | 100 | 1 | 54 | 23 | 23 |
| 17 | 70 | 150 | IR | IR2200L | 70 | 16.5 | 100 | 1 | 54 | 23 | 23 |
| 18 | 70 | 155 | EPDM | E505A | 47 | 16.0 | 100 | 1 | 54 | 23 | 23 |
| 19 | 70 | 155 | SBR | T2003 | 33 | 17.0 | 100 | 1 | 54 | 23 | 23 |
| 20 | 70 | 155 | IR | IR2200L | 70 | 16.5 | 100 | 0 | 54 | 23 | 23 |
| 21 | 70 | 160 | Butyl | Butyl065 | 32 | 15.8 | 100 | 0 | 54 | 23 | 23 |
| 22 | 70 | 145 | BR | BR150B | 40 | 16.8 | 100 | 1 | 54 | 23 | 23 |
| 23 | 70 | 160 | BR | BR150B | 40 | 16.8 | 100 | 1 | 54 | 23 | 23 |
| Comparative 1 | 60 | 155 | — | — | — | — | — | — | — | — | — |
| Comparative 2 | 60 | 149 | — | — | — | — | — | — | — | — | — |
| Comparative 3 | 70 | 150 | SBR | T2003 | 33 | 17.0 | 100 | 1 | 54 | 23 | 23 |
| Comparative 4 | 70 | 160 | Butyl | Butyl065 | 32 | 15.8 | 100 | 1 | 54 | 23 | 23 |
| Comparative 5 | 70 | 160 | SBR | T2003 | 33 | 17.0 | 100 | 1 | 54 | 23 | 23 |
| Comparative 6 | 70 | 145 | BR | BR150B | 40 | 16.8 | 100 | 1 | 54 | 23 | 23 |

In the table, A represents the release temperature of the domain A. M represents a Mooney viscosity, and SP represents SP values.

3. Characterization 3-1. Check for Presence of Matrix Domain Structure

The presence of the matrix domain structure in the conductive layer was checked by the following method. A section (thickness: 500 μm) was cut out using a razor so that a cross-section perpendicular to the longitudinal direction of the conductive layer of the electrophotographic member could be observed. Next, platinum was vapor-deposited on the surface of the section corresponding to the cross-section of the conductive layer. The platinum vapor-deposited surface of the section was photographed using a scanning electron microscope (SEM) (product name: S-4800, manufactured by Hitachi High-Technologies Corporation) at a magnification of ×5000 to obtain an SEM image. In the SEM image, the matrix domain structure was judged to be "present" if it was observed that multiple domains were dispersed in the matrix and the matrix was in communication.

3-2. Measurement of Volume Resistivity ρm of Matrix

The volume resistivity of the matrix was measured in contact mode in the following manner using a scanning probe microscope (SPM) (product name: Q-Scope 250, manufactured by Quesant Instrument Corporation). Note that the measurement environment was set such that the temperature was set to 23° C., and the relative humidity was set to 50%.

First, a section with a thickness of about 2 μm was cut out from the conductive layer of the charging roller 1 at a cutting temperature of −100° C. using a microtome (product name: Leica EMFCS, manufactured by Leica Microsystems). A cross-section of the conductive layer in the thickness direction, as illustrated in FIG. 2B, was acquired as described above by this cutting. For each of the cross-sections obtained, the measurement is performed in 15-μm square regions at three points (0.2 T, 0.5 T, and 0.7 T) in the thickness region from the outer surface of the conductive layer to the depth of 0.1 T to 0.9 T in the support member direction, and following values are calculated from the arithmetic mean of the measured values from the total 9 regions.

Next, the section was placed on a metal plate such that one surface of the section corresponding to the cross-section of the conductive layer was in contact with the surface of the metal plate. Then, a cantilever of the SPM was brought into contact with a portion corresponding to the matrix in the surface of the section opposite to the surface in contact with the surface of the metal plate. Next, a voltage of 50 V was then applied to the cantilever, and the current value was measured. In addition, the surface profile of the section was observed with the SPM, and the thickness of the measured portion was calculated from the obtained height profile. Furthermore, the area of the depressed portion in the contact region of the cantilever was calculated from the observation result of the surface profile. Volume resistivity was calculated from the thickness and the area of the depressed portion, and the volume resistivity of the matrix was determined.

3-3. Measurement of Volume Resistivity ρPd of Conductive Domain A

The volume resistivity pd of the conductive domain A was measured in the same manner as the method of measuring the volume resistivity of the matrix in the section 3-2 above, except that the contact position of the cantilever was set to a position corresponding to the conductive domain A and the voltage applied to the cantilever was set to 1 V. An average of the values at the measured portions was calculated.

3-4. Measurement of Volume Resistivity ρI of Insulating Region, Insulating Domain B The volume resistivity ρI of the insulating region, the insulating domain B, was measured in the same manner as the method of measuring the volume resistivity of the matrix in the section 3-2 above, except that the contact position of the cantilever was set to a position corresponding to the insulating region, the insulating domain B, and the voltage applied to the cantilever was set to 10 V. An average of the values at the measured portions was calculated.

The domain A and the insulating regions were distinguished from each other by the following method.

From the backscattered electron image of the image taken with the FIB-SEM, it can be judged from the contrast of the matrix and domain whether the second rubber and the conductive particles are included. Specifically, matrices and domains can be identified by an image analyzer (product name: LUZEX-AP, manufactured by NIRECO Corporation) using the contrast difference in the domains, and conductive particles represented by carbon black in each domain can be identified, and the area can be analyzed.

3-5. Measurement of Volume and Number of Domains

The volume Vd indicating the state of presence of the conductive domain A and the insulating region (domain B) in the matrix, the number proportion of the domains A and B, and the domain diameter of the domain B were calculated by the FIB-SEM measurement shown below.

The "FIB-SEM" is a method for observing a cross-section of a sample, which is processed and exposed by a focused ion beam (FIB) apparatus, using a scanning electron microscope (SEM).

Specifically, first, the conductive layer is sampled at 9 points of the conductive layer. In the case of a roller shape, when the length in the longitudinal direction is taken as L, a single sample is cut out from each position every 1200 intervals in the circumference direction of the roller at three positions near (1/4) L, (2/4) L, and (3/4) L from the end.

After that, three-dimensional measurement using a focused ion beam is performed using the FIB-SEM, and images of a cube shape with a side length of 9 μm are measured at an interval of 60 nm. Here, the cross-section of the conductive layer in each cross-section at (1/4) L, (2/4) L, and (3/4) L was measured every 1200 intervals in the circumference direction of the roller at the center portion of the surface from the core metal position.

Next, in order to suitably observe the domain structure, a pre-treatment in which the contrast between the domains and the matrix is suitably obtained is then applied. Here, a staining treatment can be suitably used. Specifically, osmium tetroxide, ruthenium tetroxide, phosphotungstic acid, and the like may be mentioned, and a dye capable of identifying the first rubber and the second rubber, respectively, can be selected as appropriate.

In the examples, osmium tetroxide was used for staining. The higher the amount of double bonds and benzene rings in rubber, the more the staining progresses. Thus, the rubber species was identified, and domains and matrices were distinguished. The domain A and the domain B can be distinguished by utilizing the contrast difference in the domain to distinguish the matrix and domain, identifying conductive particles represented by carbon black in each domain, and analyzing the area.

The resulting images were then analyzed using the 3D visualization and analysis software Avizo (registered trademark, manufactured by FEI Company Japan Ltd.). One sample in a cube shape with a side length of 9 μm was divided into 27 unit cubes with one side of 3 μm. Then, the volume Vd of the domain included in the unit cube was calculated.

Specifically, with regard to the domains including domain A and domain B observed above, when the volume Vd of the domain included in the unit cube was determined, the number of unit cubes having Vd of 2.7 to 10.8 $\mu m^3$ was counted, and the number of samples satisfying the condition (A) was checked.

Furthermore, the number of the domain A containing the electronic conductive agent and the number of the insulating domain B were each counted by the above method, and the number proportion of the domain A in the total number of domains was calculated.

3-6. Evaluation of Domain Shape

The shape of the domains included in the conductive layer was evaluated by a method of quantifying the observed image obtained with the following scanning electron microscope (SEM) by image processing.

Thin slices having a thickness of 1 mm were cut out in the same manner as the measurement of the volume resistivity of the matrix in the section 3-2 above. At this time, the thin slices acquired a plane perpendicular to the axis of the conductive support member and the fracture surface of the cross-section parallel to the plane perpendicular to the axis of the conductive support member. The cut-out positions from the conductive layer were set to three positions, that is, a position at the center part in the longitudinal direction and positions of the distance L/4 from both ends toward the center of the conductive layer, where the length in the longitudinal direction of the conductive layer was taken as L. Platinum was vapor-deposited on the slices to obtain vapor-deposited slices. Next, the surface of the vapor-deposited slice was photographed using a scanning electron microscope (SEM) (product name: S-4800, manufactured by Hitachi High-Technologies Corporation) at a magnification of ×1,000 to obtain an observed image.

Next, when the thickness of the conductive layer is taken as T, 15-μm square regions at a total of 9 points, that is, three points (0.2 T, 0.5 T, and 0.7 T) in the thickness region from the outer surface of the conductive to the depth of 0.1 T to 0.9 T layer in each of three slices obtained from the above three measurement positions were extracted as images to be analyzed.

Then, in order to quantify the shape of the domain in the analysis image, an 8-bit grayscaling was performed using image processing software Image-Pro Plus (product name, manufactured by Media Cybernetics) to obtain a 256-tone monochrome image. Next, the black and white of the image was inverted so that the domains in the fracture surface were white to obtain a binarized image. Next, the following items were calculated for the domain A group present in the binarized image by a counting function for the binarized image:

Perimeter length A (m)

Envelope perimeter length B (m)

The domain A and the domain B can be distinguished from the analysis of images based on whether conductive particles are contained or not.

Table 8 shows the results. In Table 8, the values obtained by substituting the values into the expression (5) are shown as a "perimeter length ratio A/B".

$$1.00 \le A/B \le 1.10 \tag{5}$$

(A: Perimeter length of the domain, B: Envelope perimeter length of the domain)

Impedance Measurement

Impedance was measured by the following measurement method.

First, as a pretreatment, a measurement electrode (metal film) was formed by vapor deposition of platinum on the outer surface of the charging roller while rotating the charging roller, which was an electrophotographic member. At this time, a masking tape was used to prepare an electrode that was 1.5 cm wide and uniform in circumferential direction. By forming the electrode, the contribution of the contact area between the measurement electrode and the electrophotographic material can be reduced as much as possible by the surface roughness of the electrophotographic material. Next, an aluminum sheet was tightly wound around the electrode without gaps to form a measurement sample.

Then, the aluminum sheet was connected to the measurement electrode, and the impedance measuring apparatus (product name: Solartron 1260 96 W, manufactured by Solartron Analytical) was connected to the outer surface of the support member. The impedance was measured while applying the DC voltage of 1 V or 10 V, the vibration voltage of 1 V, and the frequency of $1.0\times10^{-1}$ Hz in a superimposed manner in an environment at a temperature: of 23° C. and a relative humidity of 50%. Impedance when a DC voltage of 1 V was applied was set to impedance X. Then, impedance when a DC voltage of 10 V was applied was set to impedance Y.

A charging roller (the length in the longitudinal direction: 230 mm) was divided into five equal regions in the longitudinal direction, then a total of five measurement electrodes were formed, one at the center of each region, and the above measurement was performed. The average value thereof was used as the impedance of the charging roller.

4. Image Evaluation

In order to check the dirt resistance performance of the charging roller 1 under a long-life condition, the following evaluation was performed.

First, as an electrophotographic image forming apparatus, a laser printer of an electrophotographic system (product name: LaserJet Pro M 203 dw, manufactured by Hewlett-Packard) was prepared. Note that, to perform an evaluation in a high-speed process, the laser printer was modified so that the number of output sheets per minute was 50 sheets/min of A4 size paper, which was greater than the original number of output sheets. At this time, the output speed of the recording medium was set to 370 mm/sec.

Next, the charging roller 1, the electrophotographic image forming apparatus, and the process cartridge were left at an environment of 15° C./10% RH for 48 hours for the purpose of familiarizing them with the evaluation environment.

The charging roller 1 left under the above environment was set as a charging roller for a process cartridge and incorporated into a laser printer. Thereafter, a total of 50000 sheets of images were output consecutively under the same environment.

In the output image, the character of the alphabet "E" with four points in size formed on A4-size paper achieved a printing percentage of 1.0%.

Thereafter, half-tone images (images with horizontal lines of 1 dot wide and 2 dots spaced perpendicular to the direction of rotation of the photosensitive drum) were output. This half-tone image was observed by visual observation, and the white spot image and the white blur image were evaluated on the basis of the following criteria.

Evaluation of White Spot Image on Half-Tone Image

Rank A: No white spot images were observed on the half-tone image even when observed with a microscope.

Rank B: No white spot image was seen on the half-tone image by visual observation, but white spot images were observed by microscopic observation.

Rank C: White spot-like images were observed on a part of the half-tone image by visual observation.

Rank D: White spot images were observed on the entire half-tone image by visual observation.

Evaluation of White Blur Images

Furthermore, the charging roller 1, the electrophotographic image forming apparatus, and the process cartridge were left at an environment of 30° C./80% RH for 48 hours for the purpose of familiarizing them with the evaluation environment. In order to evaluate white blur images, a charging roller having an outer diameter deflection in the circumferential direction at the central portion of 40 μm was prepared as the charging roller 1.

The charging roller 1 left under the above environment was set as a charging roller for a process cartridge and incorporated into a laser printer. Thereafter, a total of 50000 sheets of images were output consecutively under the same environment.

In the output image, the character of the alphabet "E" with four points in size formed on A4-size paper achieved a printing percentage of 1.0%.

Thereafter, half-tone images (images with horizontal lines of 1 dot wide and 2 dots spaced perpendicular to the direction of rotation of the photosensitive drum) were output. This half-tone image was observed by visual observation, and white blur images were evaluated on the basis of the following criteria.

Evaluation of White Blur Images on Half-Tone Images

Rank A: No white blur images were observed on the half-tone image even when observed with a microscope.

Rank B: Although no white blur images were observed on the half-tone image by visual observation, white blur images were observed by a microscope.

Rank C: White blur images were visually observed on a part of the half-tone image.

Rank D: White blur images were observed on the entire half-tone image by visual observation.

Table 8 shows the results.

TABLE 8

| | | | | Matrix | DRC-A Conductive domain A | | | | | | | |
|---|---|---|---|---|---|---|---|---|---|---|---|---|
| | Roller properties | | | Volume | Volume | | | | | | | |
| Examples | Impedance X | Impedance Y | X/Y | resistivity Ω cm | resistivity Ω cm | 1 | 2 | 3 | 4 | 5 | 6 | 7 |
| 1 | 5.32E+07 | 4.83E+06 | 11.0 | 5.50E+08 | 3.80E+01 | 20 | 18 | 20 | 20 | 21 | 21 | 20 |
| 2 | 9.64E+07 | 6.23E+06 | 15.5 | 5.50E+08 | 4.21E+01 | 20 | 20 | 20 | 19 | 20 | 20 | 20 |
| 3 | 9.89E+07 | 7.54E+06 | 13.1 | 5.50E+08 | 1.26E+02 | 20 | 20 | 18 | 20 | 20 | 21 | 20 |
| 4 | 2.21E+07 | 1.52E+06 | 14.5 | 5.50E+08 | 2.76E+01 | 21 | 22 | 20 | 21 | 21 | 21 | 21 |
| 5 | 3.94E+07 | 5.14E+06 | 7.7 | 5.20E+10 | 4.98E+01 | 21 | 21 | 21 | 21 | 21 | 22 | 21 |
| 6 | 8.09E+07 | 6.22E+06 | 13.0 | 5.50E+08 | 4.19E+01 | 22 | 23 | 22 | 21 | 22 | 22 | 22 |
| 7 | 2.48E+06 | 3.23E+05 | 7.7 | 5.50E+08 | 8.90E+01 | 25 | 25 | 26 | 25 | 25 | 24 | 25 |
| 8 | 1.15E+06 | 1.38E+05 | 8.3 | 5.50E+08 | 1.27E+02 | 25 | 25 | 24 | 25 | 26 | 25 | 25 |
| 9 | 2.84E+07 | 3.54E+06 | 8.0 | 5.50E+08 | 3.69E+01 | 23 | 23 | 23 | 23 | 24 | 23 | 21 |
| 10 | 6.28E+07 | 5.23E+06 | 12.0 | 5.50E+08 | 3.60E+01 | 24 | 23 | 24 | 22 | 23 | 23 | 23 |

TABLE 8-continued

| | | | | | | | | | | | | |
|---|---|---|---|---|---|---|---|---|---|---|---|---|
| 11 | 5.99E+07 | 2.94E+06 | 20.4 | 5.50E+08 | 4.20E+01 | 22 | 23 | 23 | 23 | 23 | 23 | 24 |
| 12 | 6.11E+07 | 3.45E+06 | 17.7 | 5.50E+08 | 4.37E+01 | 22 | 23 | 24 | 24 | 24 | 23 | 24 |
| 13 | 2.43E+07 | 3.23E+06 | 7.5 | 5.50E+08 | 4.21E+01 | 23 | 23 | 23 | 23 | 22 | 23 | 23 |
| 14 | 3.60E+07 | 4.10E+06 | 8.8 | 5.50E+08 | 5.40E+01 | 24 | 24 | 24 | 24 | 23 | 24 | 24 |
| 15 | 4.90E+06 | 6.30E+05 | 7.8 | 5.50E+08 | 3.68E+01 | 24 | 23 | 23 | 23 | 23 | 22 | 23 |
| 16 | 4.23E+07 | 2.81E+06 | 15.1 | 5.50E+08 | 6.43E+01 | 23 | 23 | 23 | 23 | 24 | 23 | 23 |
| 17 | 3.76E+07 | 2.59E+06 | 14.5 | 5.50E+08 | 6.84E+01 | 23 | 24 | 23 | 23 | 23 | 23 | 23 |
| 18 | 6.98E+07 | 7.62E+06 | 9.2 | 5.50E+08 | 4.26E+01 | 23 | 23 | 24 | 23 | 23 | 23 | 23 |
| 19 | 5.46E+07 | 5.21E+06 | 10.5 | 5.50E+08 | 3.94E+01 | 24 | 24 | 24 | 24 | 24 | 23 | 24 |
| 20 | 7.21E+07 | 6.08E+06 | 11.9 | 5.50E+08 | 5.15E+01 | 24 | 24 | 24 | 24 | 24 | 24 | 24 |
| 21 | 6.77E+07 | 8.11E+06 | 8.3 | 5.50E+08 | 4.49E+01 | 23 | 23 | 23 | 23 | 23 | 23 | 23 |
| 22 | 3.99E+07 | 3.95E+06 | 10.1 | 5.50E+08 | 6.41E+01 | 24 | 24 | 24 | 24 | 24 | 23 | 24 |
| 23 | 3.36E+07 | 2.74E+06 | 12.3 | 5.50E+08 | 5.51E+01 | 24 | 23 | 23 | 23 | 23 | 23 | 23 |
| Comparative 1 | 8.78E+04 | 2.1.E+04 | 4.2 | 5.92E+12 | 69.9 | — | — | — | — | — | — | — |
| Comparative 2 | 3.69E+07 | 5.2.E+06 | 7.1 | 2.58E+09 | 52.1 | — | — | — | — | — | — | — |
| Comparative 3 | 3.20E+09 | 4.10E+08 | 7.8 | 9.40E+08 | 4.41E+01 | 22 | 22 | 22 | 22 | 22 | 21 | 22 |
| Comparative 4 | 6.80E+07 | 9.61E+06 | 7.1 | 5.50E+08 | 5.29E+01 | 23 | 23 | 22 | 23 | 23 | 23 | 23 |
| Comparative 5 | 4.12E+07 | 4.05E+06 | 10.2 | 2.60E+12 | 4.98E+01 | 21 | 20 | 21 | 21 | 21 | 21 | 21 |
| Comparative 6 | 2.90E+07 | 3.40E+06 | 8.5 | 5.50E+08 | 6.60E+01 | 24 | 23 | 24 | 24 | 24 | 24 | 24 |

| | DRC-A Conductive domain A | | | Perimeter length | DRC-B Insulating domain B | | Proportion of domain | Image evaluation 1 | White |
|---|---|---|---|---|---|---|---|---|---|
| Examples | 8 | 9 | DA number | ratio A/B | Volume resistivity | DB number | A (number %) | White spot | blur image |
| 1 | 20 | 20 | 180 | 1.09 | 1.60E+16 | 655 | 22 | B | B |
| 2 | 21 | 20 | 58 | 1.06 | 8.70E+15 | 550 | 10 | B | B |
| 3 | 20 | 20 | 49 | 1.06 | 3.60E+15 | 620 | 7 | B | C |
| 4 | 21 | 21 | 263 | 1.06 | 5.00E+15 | 694 | 27 | B | B |
| 5 | 21 | 21 | 285 | 1.04 | 6.10E+15 | 793 | 26 | B | B |
| 6 | 22 | 22 | 121 | 1.05 | 6.40E+15 | 332 | 27 | B | C |
| 7 | 25 | 25 | 310 | 1.01 | 8.40E+15 | 310 | 50 | A | B |
| 8 | 25 | 25 | 330 | 1.05 | 5.70E+15 | 271 | 55 | B | B |
| 9 | 23 | 23 | 265 | 1.10 | 2.90E+15 | 694 | 28 | A | B |
| 10 | 23 | 23 | 200 | 1.06 | 3.40E+15 | 461 | 30 | A | A |
| 11 | 23 | 23 | 286 | 1.06 | 3.80E+15 | 423 | 40 | A | B |
| 12 | 24 | 23 | 261 | 1.04 | 7.60E+15 | 619 | 30 | A | A |
| 13 | 24 | 23 | 225 | 1.04 | 2.50E+15 | 492 | 31 | A | A |
| 14 | 24 | 24 | 206 | 1.03 | 4.20E+15 | 456 | 31 | A | A |
| 15 | 23 | 23 | 227 | 1.08 | 3.40E+15 | 559 | 29 | A | B |
| 16 | 23 | 23 | 239 | 1.06 | 6.30E+15 | 611 | 28 | A | B |
| 17 | 23 | 23 | 264 | 1.07 | 8.40E+15 | 701 | 27 | A | B |
| 18 | 23 | 23 | 256 | 1.08 | 2.40E+15 | 645 | 28 | A | B |
| 19 | 24 | 24 | 237 | 1.07 | 5.60E+15 | 574 | 29 | A | B |
| 20 | 24 | 23 | 266 | 1.08 | 8.40E+15 | 651 | 29 | A | B |
| 21 | 23 | 24 | 238 | 1.09 | 5.60E+15 | 755 | 24 | B | C |
| 22 | 24 | 24 | 280 | 1.08 | 7.90E+15 | 731 | 28 | B | C |
| 23 | 23 | 23 | 275 | 1.12 | 2.80E+15 | 695 | 28 | B | B |
| Comparative 1 | — | — | — | — | — | — | — | D | B |
| Comparative 2 | — | — | — | — | — | — | — | A | D |
| Comparative 3 | 22 | 22 | 121 | 1.05 | 8.8E+13 | 378 | 24 | D | C |
| Comparative 4 | 23 | 23 | 225 | 1.09 | 5.9E+13 | 794 | 22 | D | C |
| Comparative 5 | 21 | 21 | 266 | 1.04 | 4.7E+13 | 711 | 27 | D | B |
| Comparative 6 | 24 | 24 | 259 | 1.08 | 8.6E+11 | 445 | 37 | B | D |

In the table, "1 to 9" in the column of DRC-A indicates the number of unit cubes in which Vd was 2.7 to 10.8 $\mu m^3$ in each sample sampled from 9 points of the conductive layer. That is, Examples 7 to 23 had at least 8 samples that satisfied the condition (A).

DA indicates the average number of the domains A per sample in the samples at 9 points. DB indicates the average number of domains B per sample in the samples at 9 points.

In each example, the proportion of the number of the domain B in the total number of domains was [100−(the proportion of the domain A)](number %)].

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-060863, filed Apr. 4, 2024 which is hereby incorporated by reference herein in its entirety.

What is claimed is:

1. An electrophotographic member comprising:

a support member having a conductive outer surface; and a conductive layer disposed on an outer surface of the support member, wherein the conductive layer comprises a matrix comprising a first rubber, and at least one domain dispersed in the matrix;

volume resistivity of the matrix is $1.00\times10^{8}$ to $1.00\times10^{12}$ Ω·cm;

the at least one domain comprises a domain A comprising a second rubber and an electronic conductive agent;

the conductive layer further comprises an insulating region comprising a third rubber;

a volume resistivity of the insulating region is greater than $1.00\times10^{12}$ Ω·cm;

in a case where a platinum electrode is directly disposed on an outer surface of the electrophotographic member and impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode, impedance X at a frequency of $1.0\times10^{-1}$ Hz is $1.00\times10^{6}$ to $1.00\times10^{8}$Ω; and in a case where impedance is measured while a DC voltage of 10 V and an AC voltage of 1 V in amplitude are applied in a superimposed manner between the outer surface of the support member and the platinum electrode, a relationship between impedance Y at a frequency of $1.0\times10^{-1}$ Hz and the impedance X satisfies an expression (1) below:

$$X/Y \geq 7.5. \quad (1)$$

2. The electrophotographic member according to claim 1, wherein the at least one domain comprises a domain B constituting the insulating region.

3. The electrophotographic member according to claim 2, wherein at least 8 samples out of samples with a cube shape with a side length of 9 μm sampled from 9 points of the conductive layer satisfy condition (A) below:

(A) in a case where one of the samples is divided into 27 unit cubes with a side length of 3 μm and a volume Vd of the domain included in the unit cube is determined, the number of the unit cubes with a Vd of 2.7 to 10.8 $\mu m^3$ is at least 23.

4. The electrophotographic member according to claim 3, wherein the at least 8 samples satisfying the condition (A) satisfy condition (B) below:

(B) a proportion of the number of the domain A in a total number of the domain accounts for 10 to 50 number %.

5. The electrophotographic member according to claim 4, wherein the at least 8 samples satisfying the condition (A) satisfy condition (B2) below:

(B2) a proportion of the number of the domain A in a total number of the domain accounts for 30 to 40 number %.

6. The electrophotographic member according to claim 1, wherein the impedance Y and the impedance X satisfy expression (2) below:

$$20.0 \geq X/Y \geq 7.5. \quad (2)$$

7. The electrophotographic member according to claim 1, wherein the electronic conductive agent is carbon black.

8. The electrophotographic member according to claim 1, wherein in a case where a perimeter length of the domain A is taken as A and an envelope perimeter length of the domain A is taken as B, expression (5) below is satisfied:

$$1.00 \leq A/B \leq 1.10. \quad (5)$$

9. The electrophotographic member according to claim 1, wherein:

the first rubber is NBR;

the second rubber is at least one rubber selected from the group consisting of SBR, EPDM, and IR; and the third rubber is at least one rubber selected from the group consisting of SBR, EPDM, and IR.

10. The electrophotographic member according to claim 1, wherein a volume resistivity of the domain A is $1.00\times10^{1}$ to $1.00\times10^{4}$ Ω·cm.

11. The electrophotographic member according to claim 1, wherein the electrophotographic member is a charging member.

12. A process cartridge detachably attached to a main body of an electrophotographic image forming apparatus, wherein the process cartridge comprises an electrophotographic member, the electrophotographic member comprises:

a support member having a conductive outer surface; and a conductive layer disposed on an outer surface of the support member;

the conductive layer comprises a matrix comprising a first rubber, and at least one domain dispersed in the matrix;

volume resistivity of the matrix is $1.00\times10^{8}$ to $1.00\times10^{12}$ Ω·cm;

the at least one domain comprises a domain A comprising a second rubber and an electronic conductive agent;

the conductive layer further comprises an insulating region comprising a third rubber;

a volume resistivity of the insulating region is greater than $1.00\times10^{12}$ Ω·cm;

in a case where a platinum electrode is directly disposed on an outer surface of the electrophotographic member and impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode, impedance X at a frequency of $1.0\times10^{-1}$ Hz is $1.00\times10^{6}$ to $1.00\times10^{8}$Ω; and in a case where impedance is measured while a DC voltage of 10 V and an AC voltage of 1 V in amplitude are applied in a superimposed manner between the outer surface of the support member and the platinum electrode, a relationship between impedance Y at a frequency of $1.0\times10^{-1}$ Hz and the impedance X satisfies an expression (1) below:

$$X/Y \geq 7.5. \quad (1)$$

13. An electrophotographic image forming apparatus comprising an electrophotographic member, wherein the electrophotographic member comprises:

a support member having a conductive outer surface; and a conductive layer disposed on an outer surface of the support member;

the conductive layer comprises a matrix comprising a first rubber, and at least one domain dispersed in the matrix;

volume resistivity of the matrix is $1.00\times10^{8}$ to $1.00\times10^{12}$ Ω·cm;

the at least one domain comprises a domain A comprising a second rubber and an electronic conductive agent;

the conductive layer further comprises an insulating region comprising a third rubber;

a volume resistivity of the insulating region is greater than $1.00\times10^{12}$ Ω·cm;

in a case where a platinum electrode is directly disposed on an outer surface of the electrophotographic member and impedance is measured under an environment at a temperature of 23° C. and a relative humidity of 50% while a DC voltage of 1 V and an AC voltage of 1 V in amplitude are applied in a superimposed manner between the outer surface of the support member and the platinum electrode, impedance X at a frequency of $1.0\times10^{-1}$ Hz is $1.00\times10^{6}$ to $1.00\times10^{8}$ Ω; and in a case where impedance is measured while a DC voltage of 10 V and an AC voltage of 1 V in amplitude are applied in a superimposed manner between the outer surface of the support member and the platinum electrode, a relationship between impedance Y at a frequency of $1.0\times10^{-1}$ Hz and the impedance X satisfies an expression (1) below:

$$X/Y \geq 7.5. \tag{1}$$

* * * * *